United States Patent
Kadota

(10) Patent No.: US 11,393,328 B2
(45) Date of Patent: Jul. 19, 2022

(54) SENSING SYSTEM AND SENSOR DEVICE

(71) Applicant: SONY SEMICONDUCTOR SOLUTIONS CORPORATION, Kanagawa (JP)

(72) Inventor: Ryoji Kadota, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 464 days.

(21) Appl. No.: 16/340,931

(22) PCT Filed: Oct. 17, 2017

(86) PCT No.: PCT/JP2017/037462
§ 371 (c)(1),
(2) Date: Apr. 10, 2019

(87) PCT Pub. No.: WO2018/105239
PCT Pub. Date: Jun. 14, 2018

(65) Prior Publication Data
US 2019/0287386 A1    Sep. 19, 2019

(30) Foreign Application Priority Data
Dec. 6, 2016   (JP) .............................. JP2016-236439

(51) Int. Cl.
*G08C 15/06*    (2006.01)
*G01D 9/00*     (2006.01)
(Continued)

(52) U.S. Cl.
CPC .............. *G08C 15/06* (2013.01); *G01D 9/00* (2013.01); *G04C 9/00* (2013.01); *G04F 10/00* (2013.01);
(Continued)

(58) Field of Classification Search
CPC ........ G08C 15/06; G08C 19/00; G08C 17/00; G08C 19/26; G01D 9/00; G04R 20/08;
(Continued)

(56) References Cited

U.S. PATENT DOCUMENTS

2003/0011678 A1*  1/2003  Chun ..................... H04N 7/181
                                                  348/143
2008/0066522 A1*  3/2008  Thiel .................... G01L 27/007
                                                   73/1.57
(Continued)

FOREIGN PATENT DOCUMENTS

DE     102008042412 A1   4/2009
JP        64-020828 A    1/1989
(Continued)

OTHER PUBLICATIONS

International Search Report and Written Opinion of PCT Application No. PCT/JP2017/037462, dated Dec. 26, 2017, 11 pages of ISRWO.

*Primary Examiner* — Peter J Macchiarolo
*Assistant Examiner* — Anthony W Megna Fuentes
(74) *Attorney, Agent, or Firm* — Chip Law Group

(57) ABSTRACT

To synchronize, in a system in which a plurality of devices perform measurement, measurement timings with each other with a simple configuration. A sensing system includes a plurality of sensor devices. The sensor devices each include a trigger sensor and a target sensor. In the sensor device, the trigger sensor measures a signal value of a trigger signal. Also, in the sensor device, the target sensor starts to measure a physical quantity when the signal value measured by the trigger sensor satisfies a predetermined condition.

12 Claims, 19 Drawing Sheets

(51) Int. Cl.
*G04C 9/00* (2006.01)
*G04F 10/00* (2006.01)
*G04F 10/04* (2006.01)
*G04G 5/00* (2013.01)
*G08C 19/26* (2006.01)
*G04G 21/02* (2010.01)
*G04R 20/08* (2013.01)
*G08C 17/00* (2006.01)
*G08C 19/00* (2006.01)
*G04R 20/02* (2013.01)
*G06F 1/16* (2006.01)

(52) U.S. Cl.
CPC ............... *G04F 10/04* (2013.01); *G04G 5/00* (2013.01); *G04G 21/02* (2013.01); *G04R 20/02* (2013.01); *G04R 20/08* (2013.01); *G08C 17/00* (2013.01); *G08C 19/00* (2013.01); *G08C 19/26* (2013.01); *G06F 1/163* (2013.01)

(58) Field of Classification Search
CPC .......... G04R 20/02; G04G 5/00; G04G 21/02; G04C 9/00; G04F 10/00; G04F 10/04; G06F 1/163
See application file for complete search history.

(56) References Cited

U.S. PATENT DOCUMENTS

| | | |
|---|---|---|
| 2009/0084356 A1 | 4/2009 | Nakata et al. |
| 2015/0186426 A1* | 7/2015 | Jeong ................. G06K 9/00671 |
| | | 382/103 |
| 2016/0026867 A1* | 1/2016 | Wexler ................. G06F 16/51 |
| | | 382/103 |

FOREIGN PATENT DOCUMENTS

| | | |
|---|---|---|
| JP | 04-159892 A | 6/1992 |
| JP | 06-067480 A | 3/1994 |
| JP | 11-094612 A | 4/1999 |
| JP | 2002-296137 A | 10/2002 |
| JP | 2005-069855 A | 3/2005 |
| JP | 2007-174330 A | 7/2007 |
| JP | 2009-085074 A | 4/2009 |
| JP | 2014-207641 A | 10/2014 |

* cited by examiner

SENSING SYSTEM AND SENSOR DEVICE

CROSS REFERENCE TO RELATED APPLICATIONS

This application is a U.S. National Phase of International Patent Application No. PCT/JP2017/037462 filed on Oct. 17, 2017, which claims priority benefit of Japanese Patent Application No. JP 2016-236439 filed in the Japan Patent Office on Dec. 6, 2016. Each of the above-referenced applications is hereby incorporated herein by reference in its entirety.

TECHNICAL FIELD

The present technology relates to a sensing system and a sensor device. Specifically, the present technology relates to a sensing system in which a plurality of sensor devices perform measurement, and a sensor device.

BACKGROUND ART

In recent years, there have been advanced development and study of the IoT (Internet of Things) technology that connects various objects having a communication function to the Internet or makes the objects communicate with each other, to thereby achieve automatic recognition, automatic control, telemetry, or the like. In a system using this IoT technology, in order for a plurality of communication devices to perform measurement cooperatively, it is necessary to synchronize measurement timings of the respective communication devices with each other. For example, there has been proposed a system in which a host computer wirelessly sends a command for time synchronization to a plurality of communication devices, and these communication devices start vibration measurement after synchronizing their times according to the command (for example, refer to PTL 1).

CITATION LIST

Patent Literature

[PTL 1]
Japanese Patent Laid-open No. 2007-174330

SUMMARY

Technical Problem

With the related art described above, the host computer wirelessly sends a command, thereby being capable of synchronizing the measurement timings of the respective communication devices. The related art described above, however, has a problem that the host computer is necessary in addition to the communication devices, and the system scale is consequently increased due to the host computer.

The present technology has been made in view of the situation as described above, and has an object to synchronize, in a system in which a plurality of devices perform measurement, measurement timings with each other with a simple configuration.

Solution to Problem

The present technology has been made to solve the problem described above, and according to a first aspect of the present technology, there is provided a sensing system including a plurality of sensor devices each including: a trigger sensor configured to measure a signal value of a trigger signal; and a target sensor configured to start to measure a physical quantity of a measurement target when the measured signal value satisfies a predetermined condition. As a result, this provides an action that measurement of the physical quantity is started when the signal value of the trigger signal satisfies the predetermined condition.

Also, in the first aspect, the first sensor device, that is, the plurality of sensor devices may each further include a timer configured to start time measurement when the signal value measured by the trigger sensor satisfies the predetermined condition. As a result, this provides an action that time measurement is started when the signal value of the trigger signal satisfies the predetermined condition.

Also, in the first aspect, the timer may correct time based on the signal value after time measurement is started. As a result, this provides an action that the time is corrected based on the signal value.

Also, in the first aspect, the timer may be initialized to a predetermined initial value when the signal value satisfies the predetermined condition. This provides an action that time measurement is started from the initial value when the predetermined condition is satisfied.

Also, in the first aspect, the plurality of sensor devices may each further include: a timer configured to clock time data; and a time data processing unit configured to hold, as startup time data, the time data when the signal value satisfies the predetermined condition, and generate sensor-use time data from a difference between the startup time data and the time data. As a result, this provides an action that the sensor-use time data is generated separately from the time data of the timer.

Also, in the first aspect, the plurality of sensor devices may each include, as the target sensor, a plurality of sensors configured to measure physical quantities different from each other. As a result, this provides an action that the plurality of physical quantities different from each other are measured.

Also, in the first aspect, the plurality of sensor devices may each include, as the trigger sensor, a plurality of sensors configured to measure signals different from each other. As a result, this provides an action that time measurement is started when each of signal values of the plurality of signals different from each other satisfies the predetermined condition.

Also, in the first aspect, the target sensor may measure the physical quantity in synchronization with a sampling clock having a predetermined frequency, and the trigger sensor may measure the signal value in synchronization with a sampling clock having a frequency higher than the predetermined frequency. As a result, this provides an action that the signal value is measured in synchronization with the sampling clock having a frequency higher than that of the first target sensor.

Also, in the first aspect, the trigger signal may include at least one of a sound signal and an optical signal. As a result, this provides an action that measurement of first and second physical quantities is started when a signal value of at least one of the sound signal and the optical signal satisfies the predetermined condition.

Also, in the first aspect, the target sensor may be an image sensor. As a result, this provides an action that image data is imaged when the signal value satisfies the predetermined condition.

Also, in the first aspect, the trigger sensor may be an image sensor. As a result, this provides an action that measurement of the physical quantity is started when image data satisfies the predetermined condition.

Also, according to a second aspect of the present technology, there is provided a sensor device including: a trigger sensor configured to measure a signal value of a trigger signal; and a target sensor configured to start to measure a physical quantity of a measurement target when the measured signal value satisfies a predetermined condition. As a result, this provides an action that measurement of the physical quantity of the measurement target is started when the signal value of the trigger signal satisfies the predetermined condition.

Advantageous Effect of Invention

The present technology can provide an excellent effect of synchronizing, in the system in which the plurality of devices perform measurement, the measurement timings with each other with the simple configuration. Note that, the effect described here is not necessarily limited and may be any effect described in the present disclosure.

DESCRIPTION OF EMBODIMENTS

Hereinafter, modes for embodying the present technology (hereinafter referred to as "embodiments") are described. The description is made on the following items in order.

1. First embodiment (an example in which measurement is started depending on a trigger signal)

2. Second embodiment (an example in which a plurality of devices start to measure measurement targets different from each other depending on the trigger signal)

3. Third embodiment (an example in which measurement is started depending on a plurality of trigger signals)

4. Fourth embodiment (an example in which each device starts to measure a plurality of measurement targets depending on the trigger signal)

5. Fifth embodiment (an example in which measurement is started depending on the trigger signal and time is corrected)

6. Application Example

1. First Embodiment

Configuration Example of Sensing System

Figure 1:
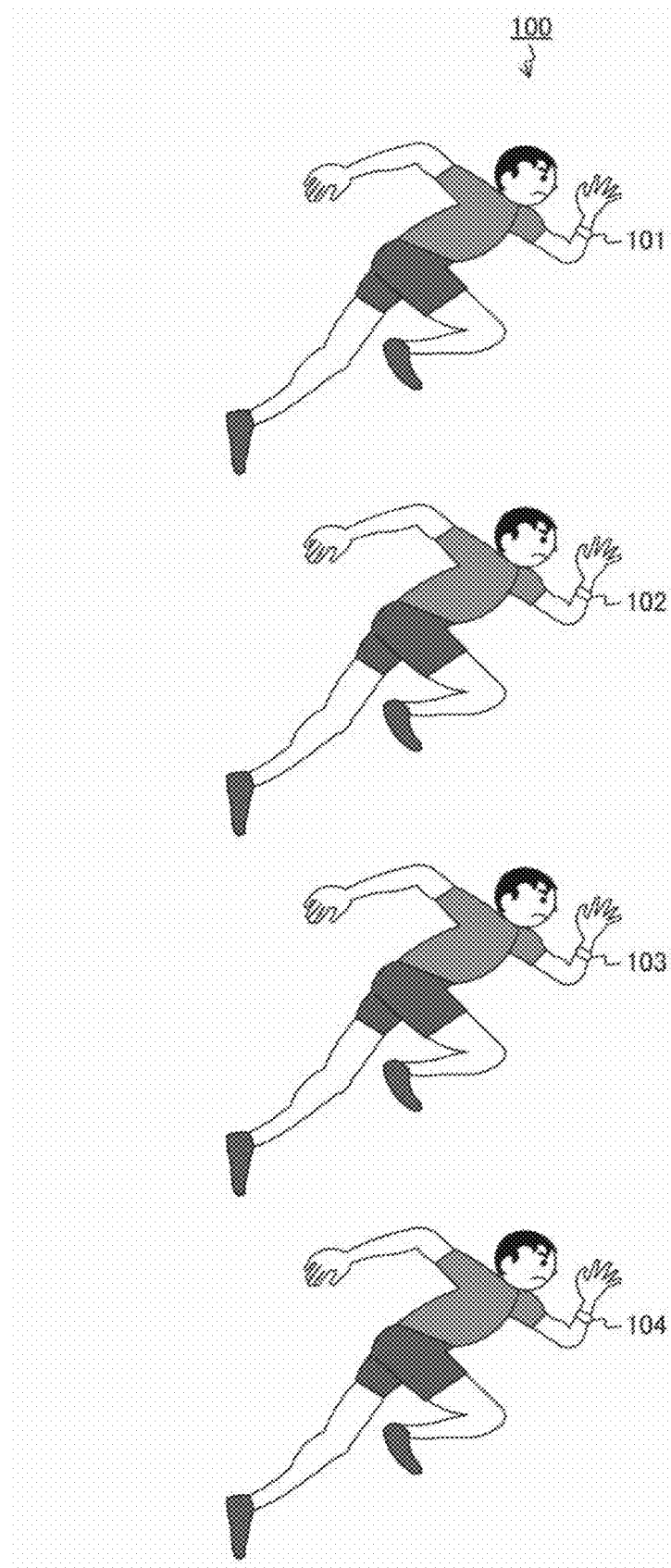
FIG. 1 is an overall view illustrating a configuration example of a sensing system according to a first embodiment of the present technology.

FIG. 1 is an overall view illustrating a configuration example of a sensing system 100 according to a first embodiment of the present technology. The sensing system 100 includes wearable devices 101, 102, 103, and 104. Note that, in this example, the four wearable devices 101 to 104 are assumed, but the number of wearable devices in the sensing system 100 is not limited to four.

The wearable device 101 is a device having a shape wearable on a body, such as a wristband type. The wearable device 101 measures a signal value of a trigger signal, and starts to measure a physical quantity of a measurement target when the signal value in question satisfies a predetermined condition. Here, the trigger signal is a signal that is used for starting physical quantity measurement, and is a sound signal or an optical signal, for example. Also, as the physical quantity, for example, acceleration, angular velocity, pulses, or temperature are measured. The wearable devices 102, 103, and 104 have the similar configuration as the wearable device 101 has.

Note that, the wearable device 101 is an example of a first sensor device described in the scope of claims, and the wearable device 102 is an example of a second sensor device described in the scope of claims.

The wearable devices 101, 102, 103, and 104 are worn by runners different from each other on a one-to-one basis, and are used for measurement of acceleration of each runner, for example.

Configuration Example of Wearable Device

Figure 2:
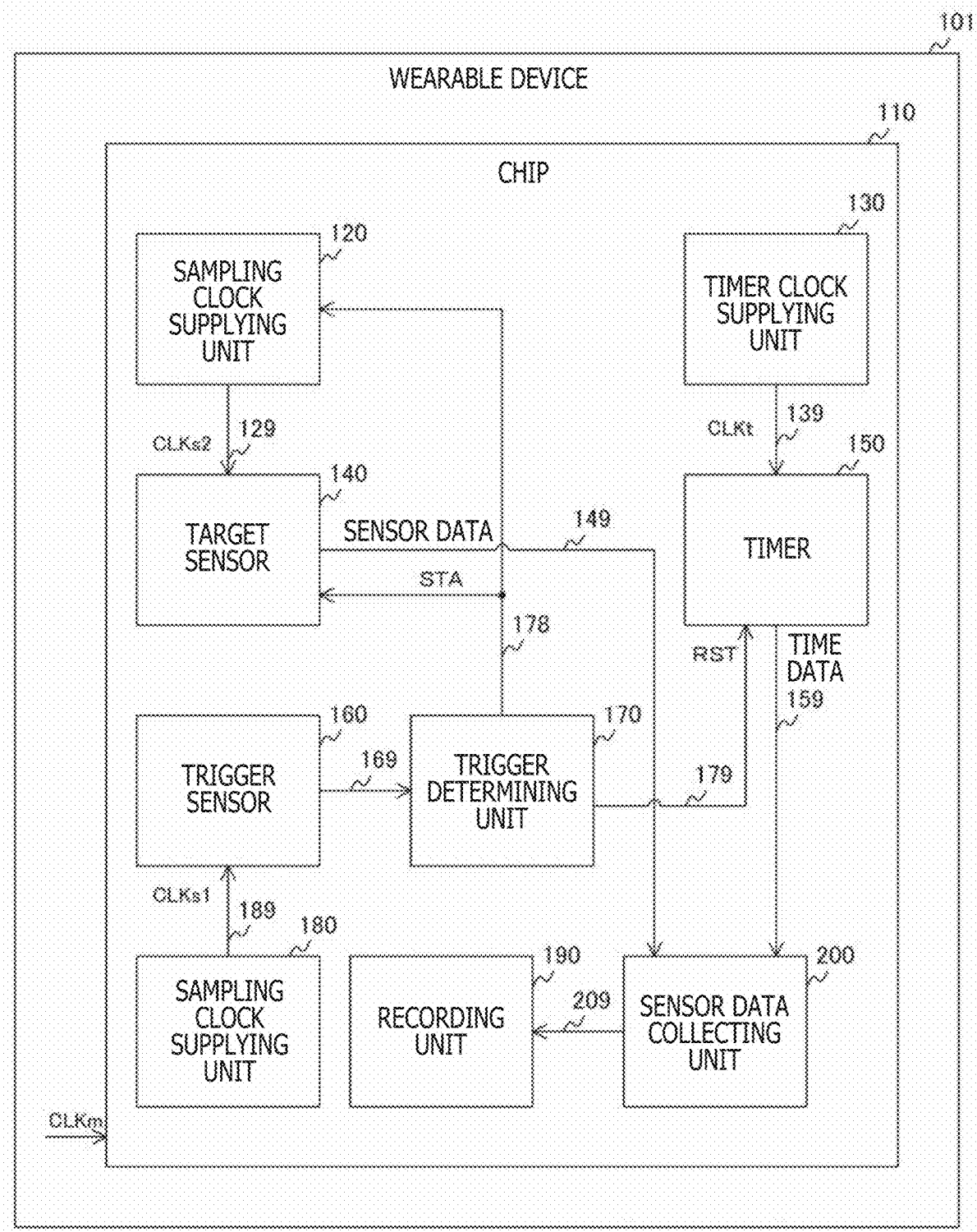
FIG. 2 is a block diagram illustrating a configuration example of a wearable device according to the first embodiment of the present technology.

FIG. 2 is a block diagram illustrating a configuration example of the wearable device 101 according to the first embodiment of the present technology. The wearable device 101 includes a chip 110. The chip 110 includes a sampling clock supplying unit 120, a timer clock supplying unit 130, a target sensor 140, a timer 150, a trigger sensor 160, a trigger determining unit 170, and a sampling clock supplying unit 180. Also, the chip 110 includes a recording unit 190 and a sensor data collecting unit 200. The circuits in the chip 110 each operate in synchronization with a main clock CLKm.

The sampling clock supplying unit 180 generates a sampling clock CLKs1 having a predetermined frequency, and supplies the sampling clock CLKs1 to the trigger sensor 160 via a signal line 189. The sampling clock CLKs1 is generated by, for example, a crystal oscillator, a phase-locked loop, a divider, or the like. The frequency of the sampling clock CLKs1 is lower than that of the main clock CLKm.

The trigger sensor 160 measures the signal value of the trigger signal in synchronization with the sampling clock CLKs1. Here, the term "measure" means replacing the measurement target with a numerical value or a symbol. The trigger sensor 160 converts the trigger signal of the measurement target to sensor data representing the signal value of the trigger signal (more specifically, performs measurement), and sends the sensor data to the trigger determining unit 170 via a signal line 169.

When a sound signal is used as the trigger signal, a microphone is used as the trigger sensor 160. Also, when an optical signal is used as the trigger signal, an optical sensor is used as the trigger sensor 160.

The trigger determining unit 170 determines whether the signal value of the trigger signal satisfies the predetermined condition or not. For example, the trigger determining unit 170 compares the signal value and a predetermined threshold with each other, and determines that the condition is satisfied when the signal value exceeds the threshold. When the condition is satisfied, the trigger determining unit 170 generates a start signal STA for starting measurement and a reset signal RST for initializing time data. In addition, the trigger determining unit 170 supplies the start signal STA to the sampling clock supplying unit 120 and the target sensor 140 via a signal line 178, and supplies the reset signal RST to the timer 150 via a signal line 179. The reset signal RST is sent simultaneously with the start signal STA, and hence the wearable device 101 can simultaneously perform measurement timing synchronization and time synchronization.

Note that, the trigger determining unit 170 determines that the condition is satisfied when determining that the signal value exceeds the threshold as a result of comparison between the signal value and the threshold, but the method of determining whether the condition is satisfied or not is not limited to comparison with the threshold. For example, the trigger determining unit 170 may compare data including the predetermined number of signal values with a certain signal pattern (sound pattern, for example), and determine that the condition is satisfied when the data substantially matches the pattern.

The sampling clock supplying unit 120 starts to generate, when the start signal STA is input, a sampling clock CLKs2, and supplies the sampling clock CLKs2 to the target sensor 140 via a signal line 129.

Here, the frequency of the sampling clock CLKs1 that is used for measurement of the trigger signal is desirably higher than that of the sampling clock CLKs2 that is used for measurement of acceleration or other matters. For example, a clock having 16 kilohertz (kHz) is used as the sampling clock CLKs1, and a clock having 100 hertz (Hz) is used as the sampling clock CLKs2.

The target sensor 140 starts to measure the physical quantity (acceleration, for example) when the start signal STA is input. The target sensor 140 performs measurement in synchronization with the sampling clock CLKs2, and generates the sensor data representing the measured value. Then, the target sensor 140 supplies the sensor data to the sensor data collecting unit 200 via a signal line 149.

The timer clock supplying unit 130 supplies a timer clock CLKt having a predetermined frequency to the timer 150 via a signal line 139. The frequency of the timer clock CLKt is lower than that of the main clock CLKm. For example, a clock having a frequency of 32.768 kilohertz (kHz) is used as the timer clock CLKt.

The timer 150 clocks time in synchronization with the timer clock CLKt, and generates the time data representing the time. The timer 150 sets the time data to a predetermined initial value when the reset signal RST is input. Also, the timer 150 supplies the time data to the sensor data collecting unit 200 via a signal line 159.

The sensor data collecting unit 200 stores, in the recording unit 190, the sensor data and the time data when the sensor data in question is measured in association with each other. The recording unit 190 records the sensor data and the time data.

Note that, the wearable device 101 records the sensor data and the time data, but these pieces of data may be sent outside wirelessly or with a cable.

Also, the chip 110 is provided to the wearable device, but the chip 110 may be provided to a device other than the wearable device as long as the device measures the physical quantity. The chip 110 can be provided to a mobile device or a desktop device, for example.

Figure 3:
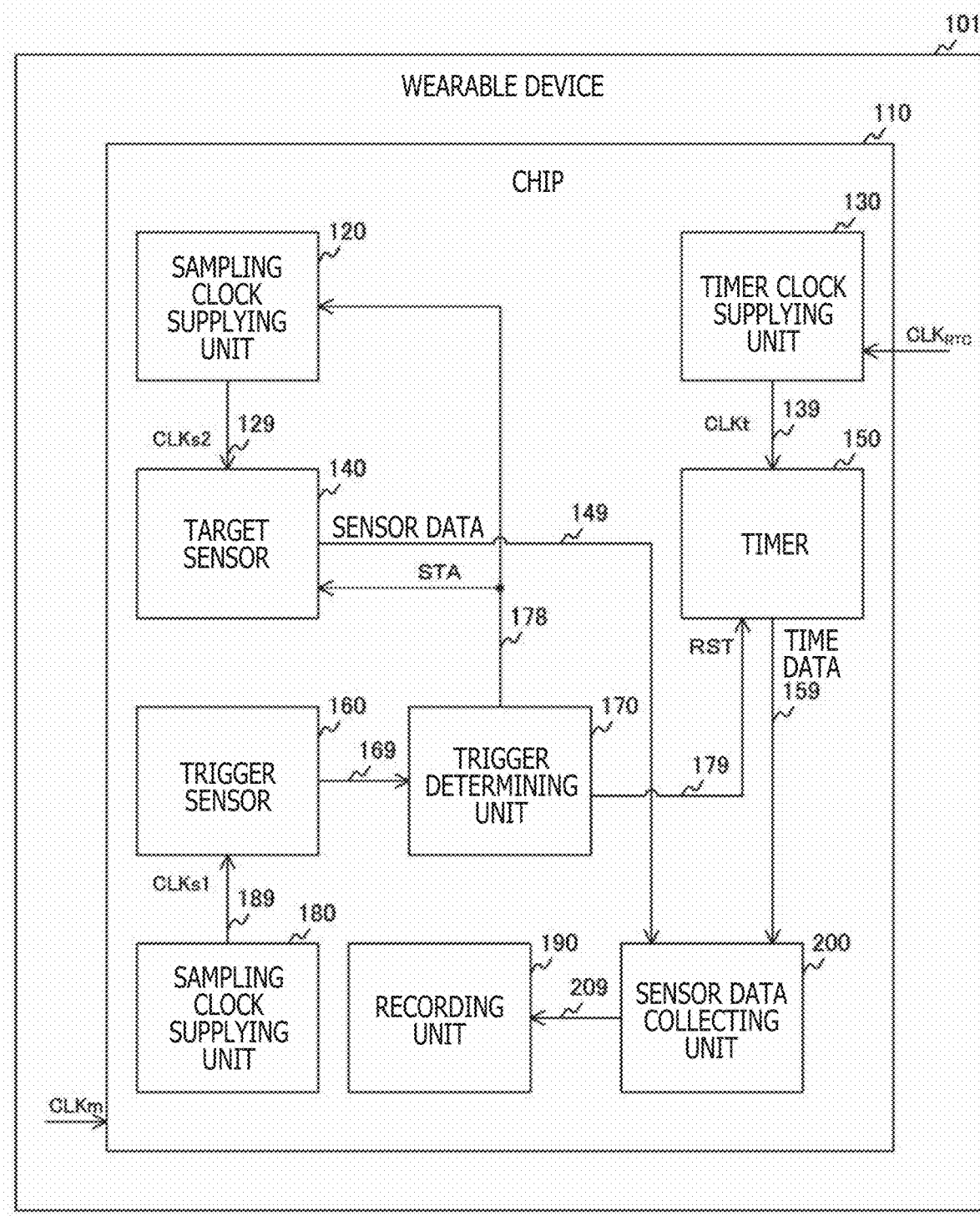
FIG. 3 is a block diagram illustrating a configuration example of the wearable device configured to perform time measurement in synchronization with a real-time clock according to the first embodiment of the present technology.

Also, the timer 150, which performs time measurement using the timer clock CLKt synchronized with the main clock CLKm, may perform time measurement using a timer clock synchronized with CLKRTc from a real-time clock as exemplified in FIG. 3. Here, the real-time clock is a circuit configured to continue time measurement with a battery even when the power supply of the device is off, and supplies the clock $CLK_{RTC}$ having 32.768 hertz (Hz), for example.

Figures 4, 5:
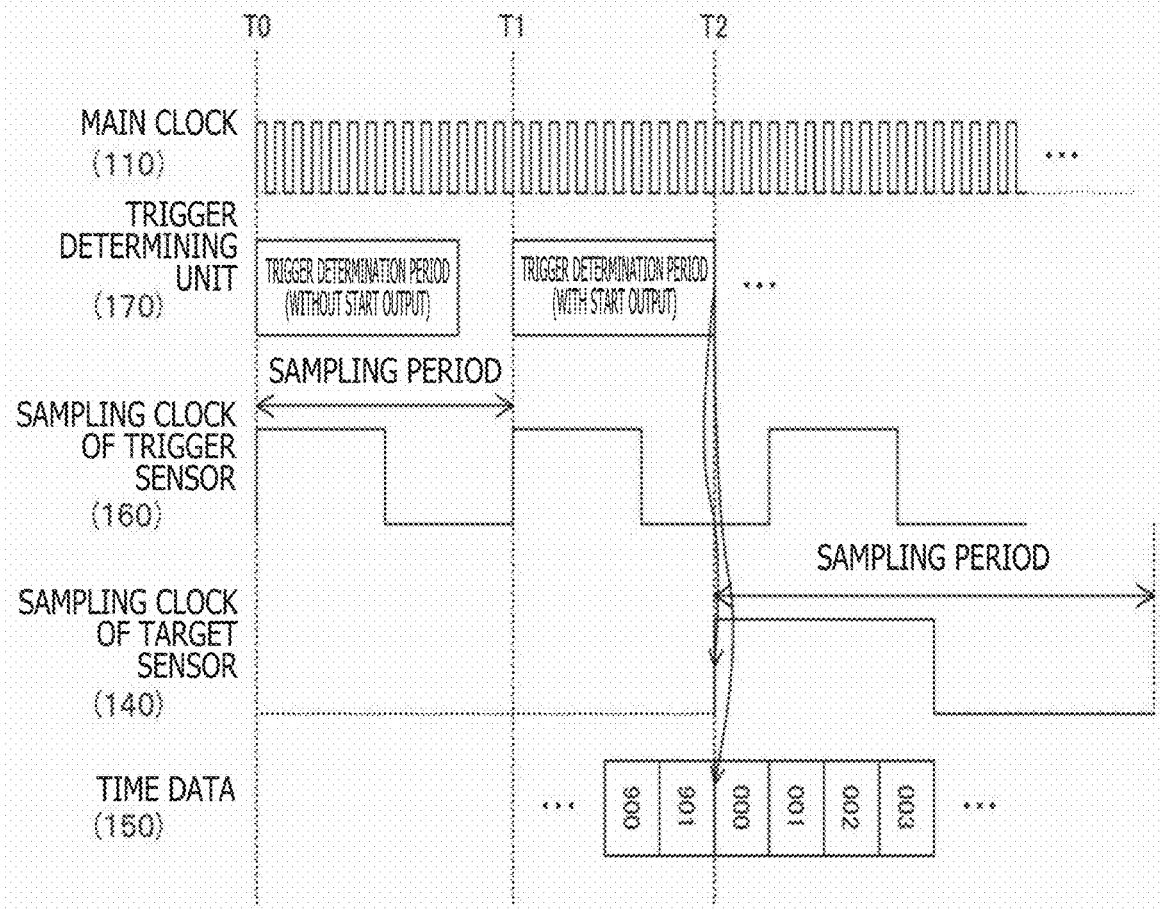
FIG. 4 is a diagram illustrating an example of data to be recorded on a recording unit according to the first embodiment of the present technology.
FIG. 5 is a timing chart illustrating an example of operation of the wearable device according to the first embodiment of the present technology.

FIG. 4 is a diagram illustrating an example of data to be recorded on the recording unit 190 according to the first embodiment of the present technology. For example, acceleration is measured as the sensor data and time in a format of "HH:SS:fff" is clocked as the time data. Here, "HH" represents a minute, "SS" represents a second, and "fff" represents a millisecond.

When the start signal STA is generated, the time data is initialized to "00:00:000," for example, and "5.88" meters per second squared (m/s$^2$) is measured as first acceleration, for example. When the sampling clock CLKs2 has 100 hertz (Hz), after 0.01 seconds, at "00:00:010," "5.80" meters per second squared (m/s$^2$) is measured as next acceleration, for example.

In this case, the sensor data collecting unit 200 stores the time data of "00:00:000" and the sensor data of "5.88" in the recording unit 190 in association with each other, and stores the time data of "00:00:010" and the sensor data of "5.80" in the recording unit 190 in association with each other.

FIG. 5 is a timing chart illustrating an example of operation of the wearable device 101 according to the first embodiment of the present technology.

To the chip 110, the main clock CLKm is input. The trigger sensor 160 measures the signal value of the trigger signal in synchronization with the sampling clock CLKs1. Also, the trigger determining unit 170 determines, in a period in which a trigger determination period elapses from a timing T0 at which the sampling clock CLKs1 rises, whether the signal value in question exceeds the threshold or not in synchronization with the main clock CLKm. Here, the length of the trigger determination period is set to a value larger than that of the period of the main clock CLKm and smaller than that of the period of the sampling clock CLKs1. With the trigger determination period set in this way, the synchronization accuracy only depends on the period of the sampling clock CLKs1 and a phase difference in the clock in question between the devices. In the trigger determination period that starts from the timing T0, the signal value does not exceed the threshold. In this case, the start signal STA is not output.

On the other hand, the timer 150 clocks time in synchronization with the timer clock CLKt. Note that, in FIG. 5, for the sake of the description, the millisecond values of the time data are only illustrated.

When the signal value exceeds the threshold in a trigger determination period that starts from a timing T1, after the trigger determination period elapses, at a timing T2, the start signal STA is output. Depending on the start signal STA, the target sensor 140 starts to measure, for example, acceleration in synchronization with the sampling clock CLKs2. Also, the trigger determining unit 170 initializes the time data with the reset signal RST at the timing T2.

Figure 6:
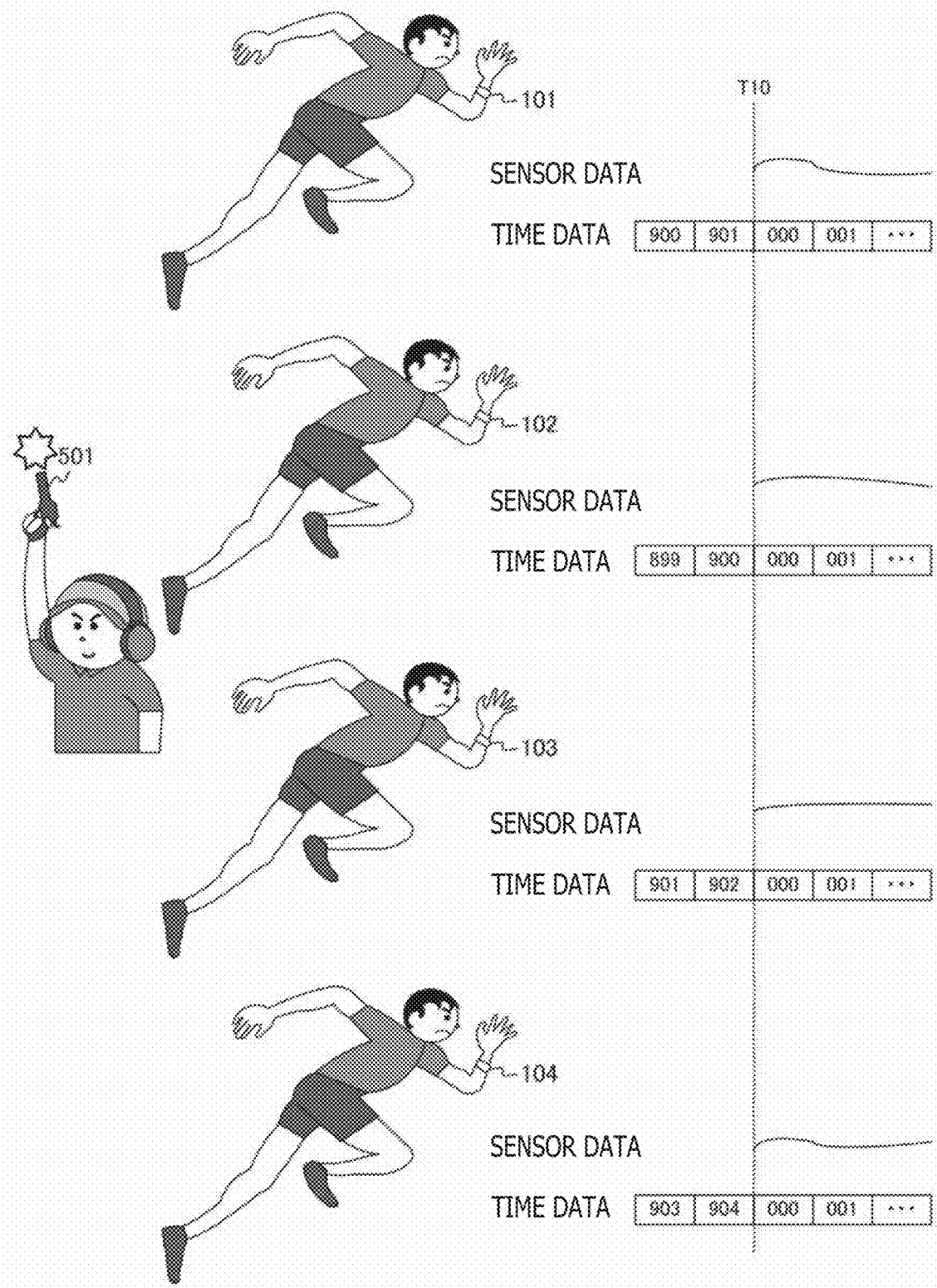
FIG. 6 is a diagram illustrating a usage method of the sensing system according to the first embodiment of the present technology.

FIG. 6 is a diagram illustrating a usage method of the sensing system according to the first embodiment of the present technology. The sensing system 100 is used for measurement of acceleration of each of a plurality of runners in track and field such as short-distance running. The wearable devices 101 to 104 in the sensing system 100 are worn by the respective runners. Also, a sound signal is used as the trigger signal. In addition, as the threshold to be compared with the signal value of the trigger signal, a value smaller than the volume of sound that is generated when a starter pistol 501 is fired is set.

When a starter fires the starter pistol 501 at a timing T10, each runner starts to accelerate. At this time, a value of the sound signal from the starter pistol 501 exceeds the threshold, and hence the wearable devices 101 to 104 each start to measure acceleration and initialize the time data to perform time measurement.

In this way, with the wearable devices 101 to 104 each starting to measure acceleration depending on the sound signal, the measurement timings of the respective devices can be synchronized with each other.

As described above, a host computer can be provided so that the host computer sends a command via a network to synchronize the timings with each other. With this configuration, however, the scale and cost of the system are increased due to the host computer. Also, it is necessary to build a wired or wireless network between the host computer and the devices.

In contrast to this, with the configuration in which the wearable devices 101 to 104 each start measurement depending on the trigger signal (sound signal, for example), the host computer and the network are unnecessary, and the scale and cost of the system can be reduced.

Figure 7:
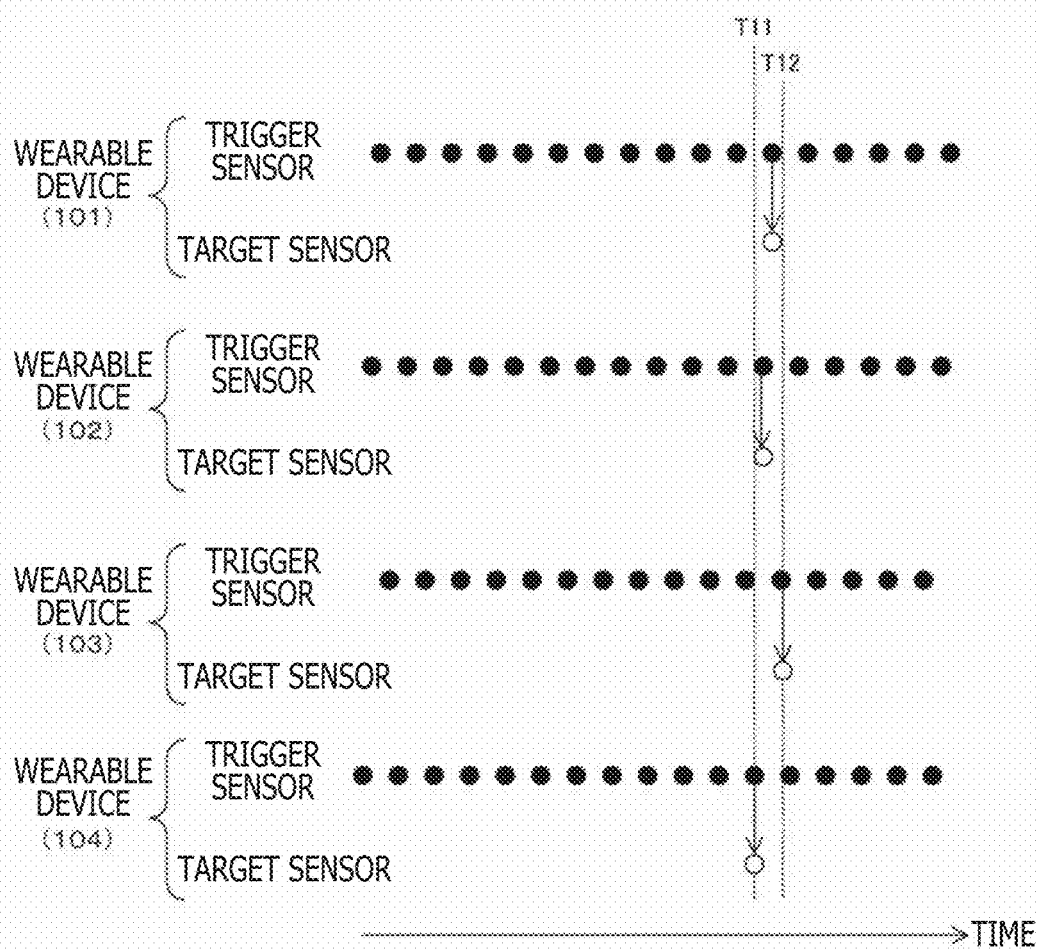
FIG. 7 is a timing chart illustrating an example of operation of the sensing system according to the first embodiment of the present technology.

Note that, the sound signal is used as the trigger signal, but an optical signal may be used as the trigger signal instead of the sound signal. In a case where strobe light is emitted upon generation of the sound by the starter pistol 501, for example, an optical signal can be used as the trigger signal. The light speed is faster than the sound speed, and hence using an optical signal as the trigger signal can reduce time required for the trigger signal to arrive at the device, thereby improving the synchronization accuracy. Also, a signal other than a sound signal and an optical signal can be used as the trigger signal as long as the signal can be measured by a sensor. 100 are worn by the respective runners. Also, a sound signal is used as the trigger FIG. 7 is a timing chart illustrating an example of operation of the sensing system according to the first embodiment of the present technology. In FIG. 7, the black circles represent timings at which the trigger sensor 160 performs measurement. Also, the white circles represent timings at which the target sensor 140 starts to perform measurement.

The sampling clocks CLKs1 to the trigger sensors 160 of the respective wearable devices 101 to 104 are not synchronized with each other. This means that the timings at which the respective wearable devices 101 to 104 start measurement are not strictly simultaneous. The maximum value of deviation in timing synchronization is a value of the period of the sampling clock CLKs1.

When the starter pistol 501 is fired at a timing T11, for example, each device starts measurement in a period in which the period of the sampling clock CLKs1 elapses from the timing T11. For example, the wearable device 104 starts measurement at the timing T11, and the wearable device 103 starts measurement at a timing T12. Other devices start measurement in a period between the timings T11 and T12.

The sampling clock CLKs1 having a frequency of 16 kilohertz (kHz) has a period of 62.5 microseconds (μs). In this case, with a reference being a measurement start timing of a certain device, a deviation in timing of another device from the reference is at most ±62.5 microseconds (μs). Here, the symbol represents whether the timing is advanced or delayed from the reference timing. Also, with the sampling clock CLKs1 having a frequency of 1 megahertz (MHz), the timing deviation can be reduced to at most ±1 microsecond (μs).

In a system in which a host computer synchronizes timings with each other by sending a command as a packet, for example, the timing deviation is approximately from ±1 microsecond (μs) to ±100 microseconds (μs) due to time required for calculating algorithm for packet processing or transmission delay.

Also, there is a system in which devices each receive electromagnetic waves from a GPS (Global Positioning System) satellite and obtain time from the received data, thereby synchronizing their timings. With this configuration, the timing deviation is at most approximately ±1 microsecond (μs).

Besides, a system in which devices each have built therein a radio clock configured to receive standard radio waves to correct time is conceivable. With this configuration, the timing deviation is at most approximately ±10 milliseconds (ms).

In contrast to these systems, in the sensing system 100 that uses a sound signal as the trigger signal, the deviation amount of timing synchronization can be the same as or smaller than the ones above. Also, the scale and cost of the system can be reduced compared to the system in which the host computer is provided. Also, the system configured to receive electromagnetic waves from a GPS satellite cannot be used indoors, but the sensing system 100 can be used indoors. Also, the system having built therein the radio clocks requires a few minutes for time correction, but the sensing system 100 can synchronize the timings in a shorter time.

Operation Example of Wearable Device

Figure 8:
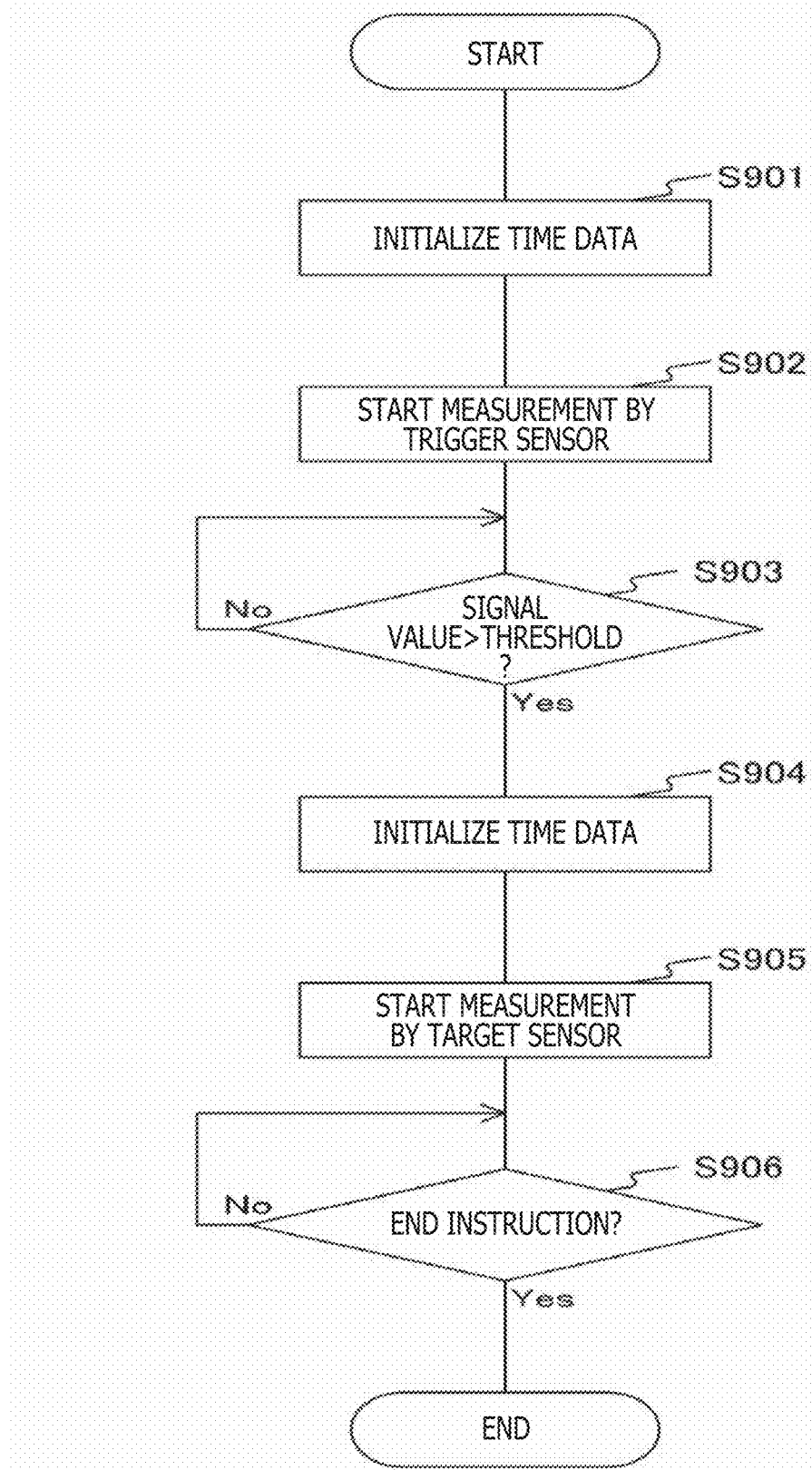
FIG. 8 is a flowchart illustrating an example of operation of the wearable device according to the first embodiment of the present technology.

FIG. 8 is a flowchart illustrating an example of operation of the wearable device 101 according to the first embodiment of the present technology. This operation is started when, for example, the wearable device 101 is supplied with power supply or a predetermined application is executed.

The wearable device 101 initializes the time data to start time measurement (Step S901). Also, the wearable device 101 starts measurement by the trigger sensor 160 (Step S902). In addition, the wearable device 101 determines whether the signal value of the trigger signal exceeds the threshold or not (Step S903). When the signal value does not exceed the threshold (Step S903: No), the wearable device 101 repeats Step S903.

When the signal value exceeds the threshold (Step S903: Yes), on the other hand, the wearable device 101 initializes the time data to continue time measurement (Step S904), and starts measurement by the target sensor 140 (Step S905). In addition, the wearable device 101 determines whether or not an instruction to end measurement is issued by a user performing predetermined switch operation, for example (Step S906). When the instruction to end measurement is not issued (Step S906: No), the wearable device 101 continues measurement, and repeats Step S906. When the instruction to end measurement is issued (Step S906: Yes), on the other hand, the wearable device 101 ends the operation for measurement.

In this way, according to the first embodiment of the present technology, the wearable devices 101 to 104 start measurement when the value of the trigger signal satisfies the predetermined condition, and the measurement timings of the respective devices can therefore be synchronized with each other without a host computer.

First Modified Example

In the first embodiment described above, the wearable device 101 and other devices are provided with the chip 110 to be used for track and field, but a monitoring camera can be provided with the chip 110 to be used for monitoring or crime prevention. A system according to a first modified example of the first embodiment is different from the first embodiment in that measurement timings of a plurality of monitoring cameras are synchronized with each other.

Figure 9:
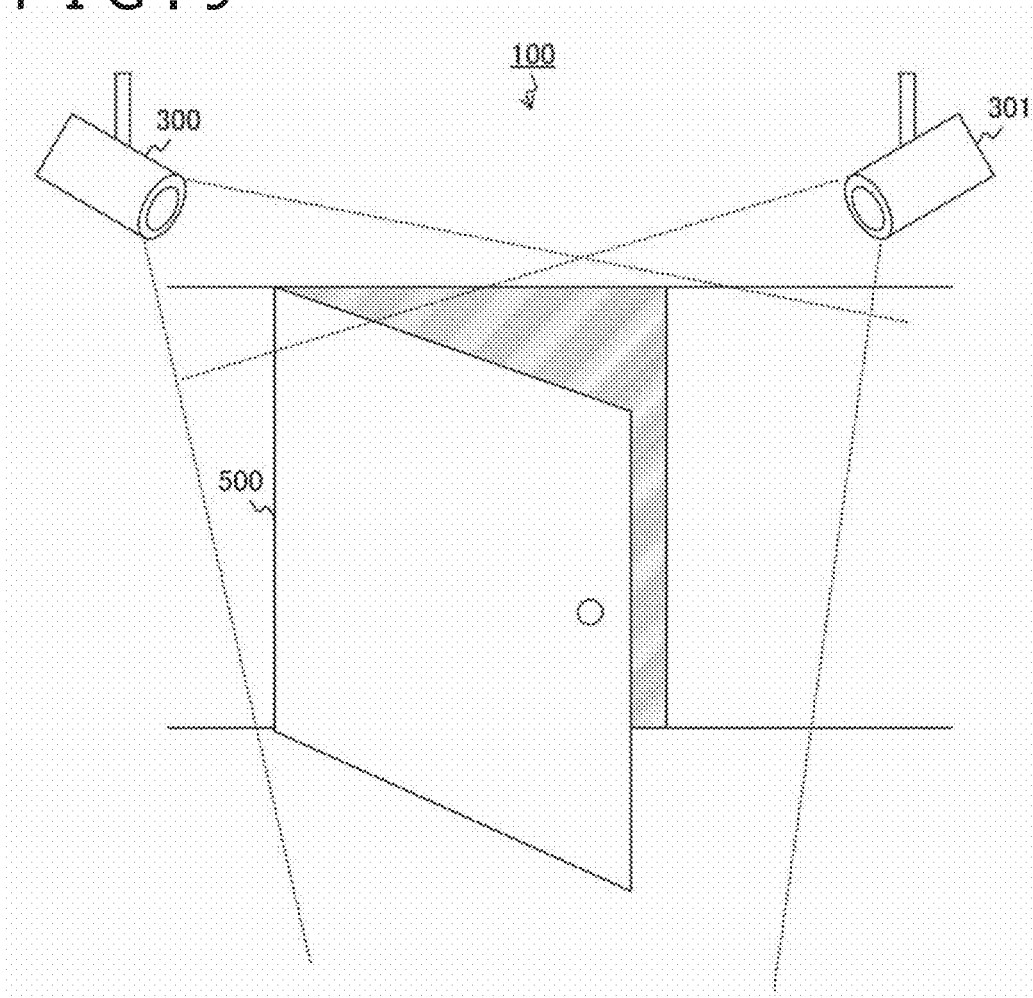
FIG. 9 is a diagram illustrating a configuration example of a sensing system according to a first modified example of the first embodiment of the present technology.

FIG. 9 is a diagram illustrating a configuration example of the sensing system 100 according to the first modified example of the first embodiment of the present technology. The sensing system 100 according to the first modified example of the first embodiment includes monitoring cameras 300 and 301.

The monitoring camera 300 includes the chip 110 like the one in the first embodiment. As the target sensor 140, however, an image sensor is used. The trigger determining unit 170 in the monitoring camera 300 compares a sound pattern when a door is opened and sound data including the signal value of the trigger signal (sound signal) with each other, and supplies the start signal STA to the target sensor 140 (image sensor) when the two substantially match each other. The image sensor starts measurement of the received light amount of each pixel (in other words, imaging of image data) depending on the start signal STA. The configuration of the monitoring camera 301 is similar to that of the monitoring camera 300.

Here, in a general monitoring system, monitoring cameras are each connected to a host computer via a wireless or wired network, and are synchronized with each other according to a command sent from the host computer.

In contrast to this, in the sensing system 100 that uses a sound signal as the trigger signal, neither network building nor a host computer is necessary. Consequently, with no network and host computer, the scale and cost of the system can be reduced.

In this way, in the first modified example of the first embodiment of the present technology, the monitoring cameras 300 and 301 start imaging when the value of the trigger signal satisfies the predetermined condition, and hence the imaging timings of the respective monitoring cameras can be synchronized with each other without a host computer.

Second Modified Example

In the first embodiment described above, the wearable device 101 and other devices are worn by the runners to be used for track and field. The wearable device 101 and other devices may, however, be worn by musical instruments or players to be used for orchestra recording. A system according to a second modified example of the first embodiment is different from the first embodiment in that the measurement timings of the respective devices worn by the musical instruments or the players are synchronized with each other.

Figure 10:
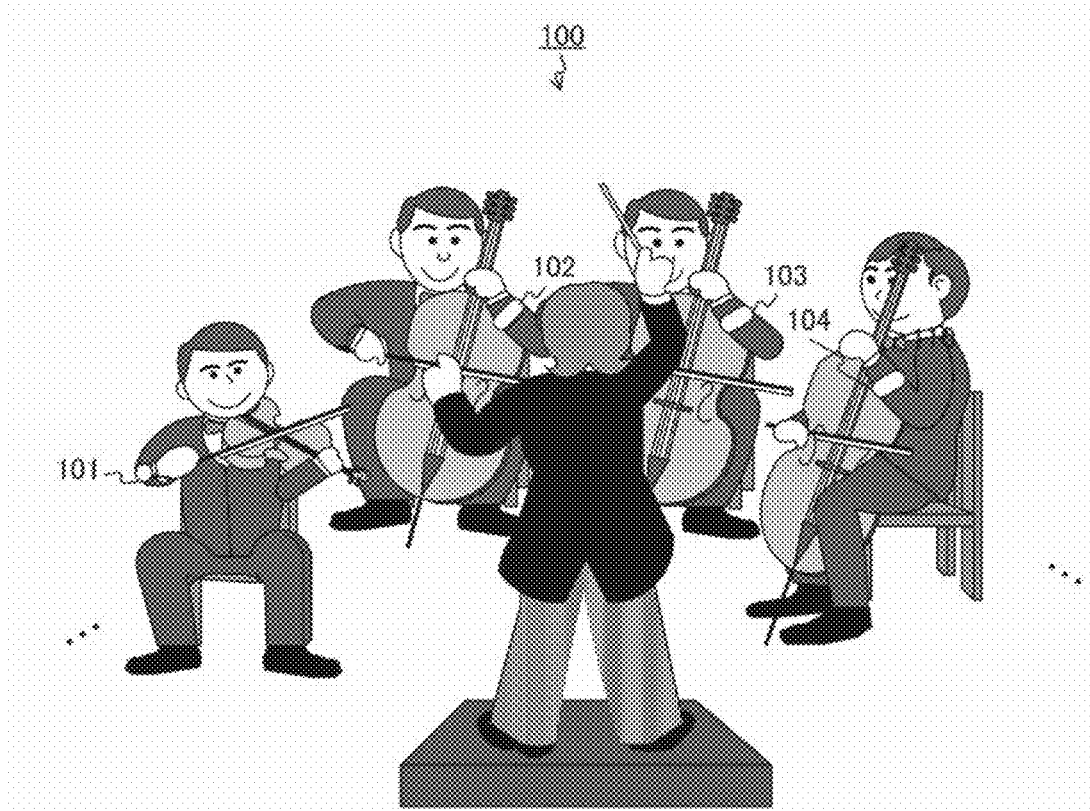
FIG. 10 is a view illustrating a configuration example of a sensing system according to a second modified example of the first embodiment of the present technology.

FIG. 10 is a view illustrating a configuration example of the sensing system 100 according to the second modified example of the first embodiment of the present technology. In the second modified example of the first embodiment, each of the wearable devices 101 to 104 is worn by the musical instrument or the player. Also, an optical signal is used as the trigger signal, and an image sensor is used as the trigger sensor 160. A microphone is used as the target sensor 140.

The trigger determining unit 170 recognizes, by analyzing image data imaged by the image sensor, a conductor's gesture that indicates start of musical performance. In addition, when successfully recognizing the gesture, the trigger determining unit 170 determines that the condition is satisfied, and makes the target sensor 140 start to measure sound. The measured sound is recorded on the recording unit 190 (more specifically, sound recording is performed).

In general orchestra recording, a plurality of microphones are connected to a recorder wirelessly or with a cable, and the recorder records sound data from these microphones in a synchronized manner. In contrast to this, in the sensing system 100, it is not necessary to connect each wearable device to a recorder, and hence the configuration of the system can be simplified.

In this way, in the second modified example of the first embodiment of the present technology, the wearable device 101 and other devices start sound recording when the value of the trigger signal satisfies the predetermined condition, and hence the timings of sound recording of the respective devices can be synchronized with each other with the simple configuration.

Third Modified Example

In the first embodiment described above, the time data of the timer 150 is initialized. In a case where the time data is used as an internal clock of the chip 110, however, the time data is desirably not changed. A third modified example of the first embodiment is different from the first embodiment in that the time data of the timer 150 is not initialized, and time data for the sensor is separately generated.

Figure 11:
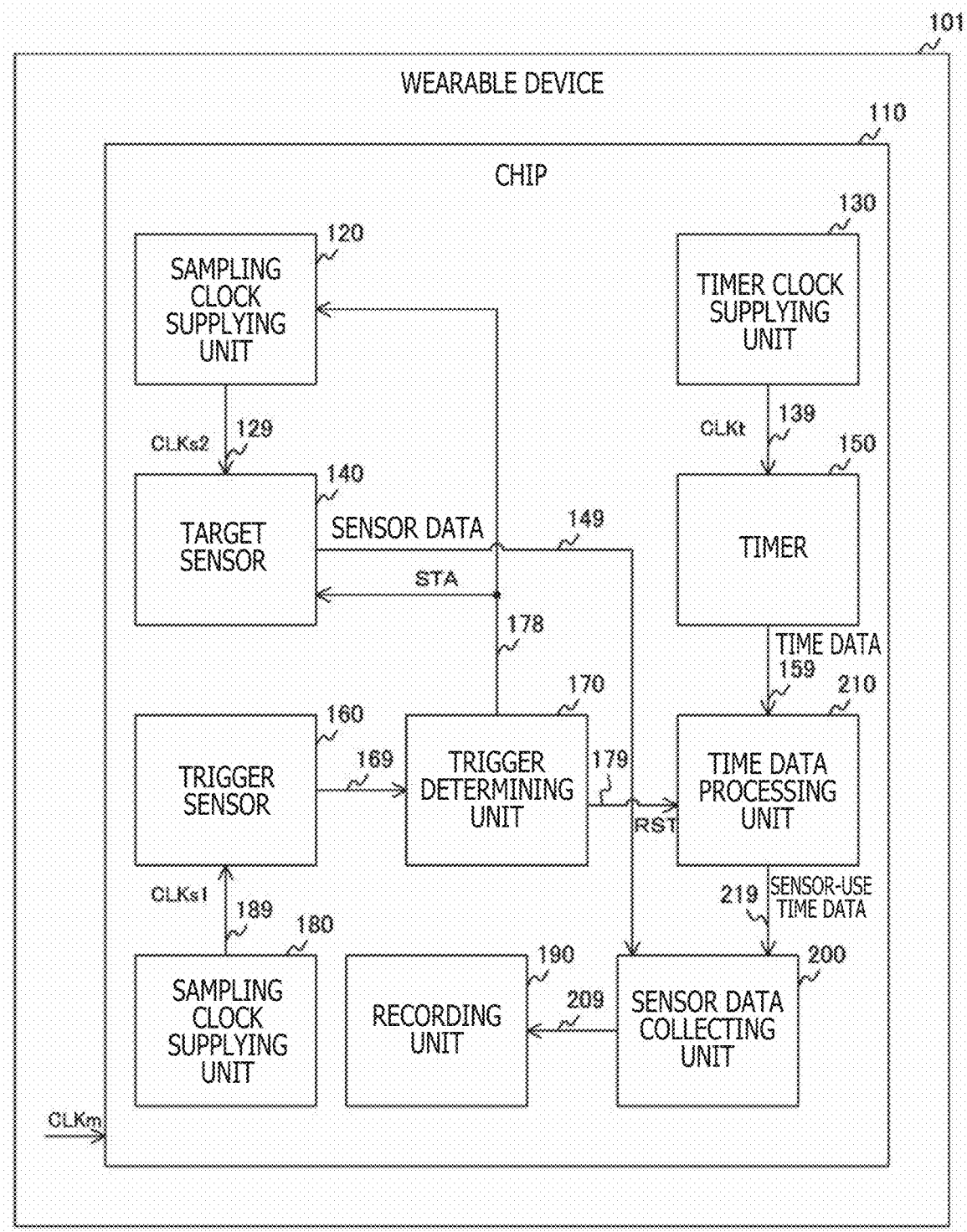
FIG. 11 is a block diagram illustrating a configuration example of a wearable device according to a third modified example of the first embodiment of the present technology.

FIG. 11 is a block diagram illustrating a configuration example of the wearable device 101 according to the third modified example of the first embodiment of the present technology. The wearable device 101 of the third modified example is different from the first embodiment in that the wearable device 101 further includes a time data processing unit 210. Note that, the timer 150 may perform time measurement using a timer clock synchronized with CLKRTc from the real-time clock.

Figure 12:
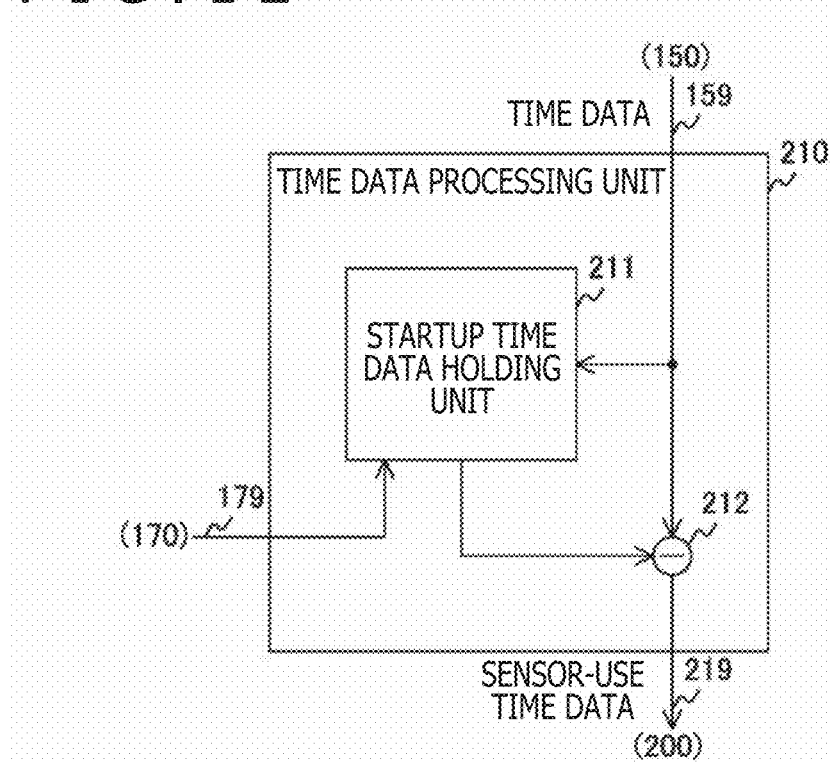
FIG. 12 is a block diagram illustrating a configuration example of a time data processing unit according to the third modified example of the first embodiment of the present technology.

FIG. 12 is a block diagram illustrating a configuration example of the time data processing unit 210 according to the third modified example of the first embodiment of the present technology. The time data processing unit 210 includes a startup time data holding unit 211 and a subtractor 212.

The startup time data holding unit 211 holds, as startup time data, time data when the reset signal RST from the trigger determining unit 170 rises. The startup time data holding unit 211 supplies the startup time data in question to the subtractor 212. Note that, the time data that the timer 150 clocks is not initialized and is used as the internal clock in the chip 110, for example.

The subtractor 212 computes a difference between the startup time data and the time data from the timer 150. The subtractor 212 supplies time data corresponding to the difference in question to the sensor data collecting unit 200 as sensor-use time data.

Figure 13:
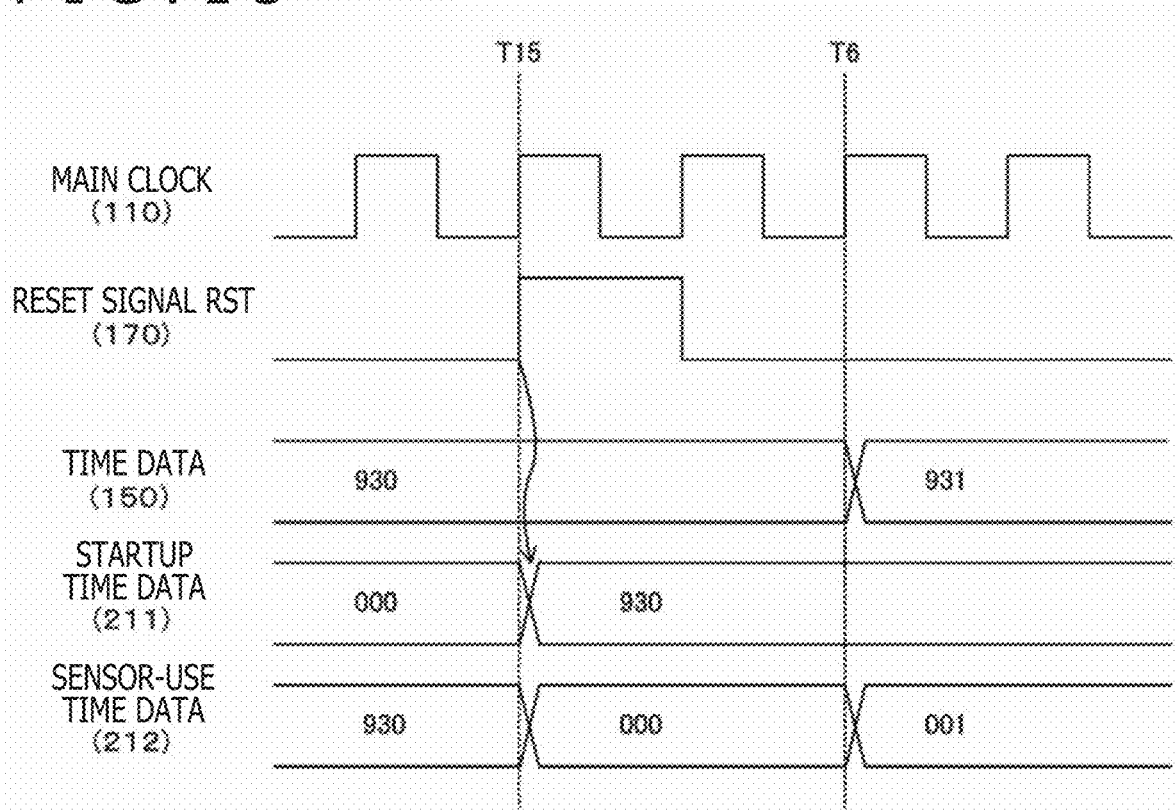
FIG. 13 is a timing chart illustrating an example of clock operation according to the third modified example of the first embodiment of the present technology.

FIG. 13 is a timing chart illustrating an example of clock operation according to the third modified example of the first embodiment of the present technology. In FIG. 13, for the sake of the description, the millisecond values of the time data are only illustrated. When the reset signal RST rises at a timing T15, the time data holding unit 211 holds time data at this time (for example, "930") as the startup time data. Also, the subtractor 212 outputs a difference between the startup time data and the time data of the timer 150 as the sensor-use time data. At the timing T1, the difference (sensor-use time data) is "000." In addition, when the time data of the timer 150 is updated to "931" at the timing T2, the sensor-use time data is also updated to "001."

Figure 14:
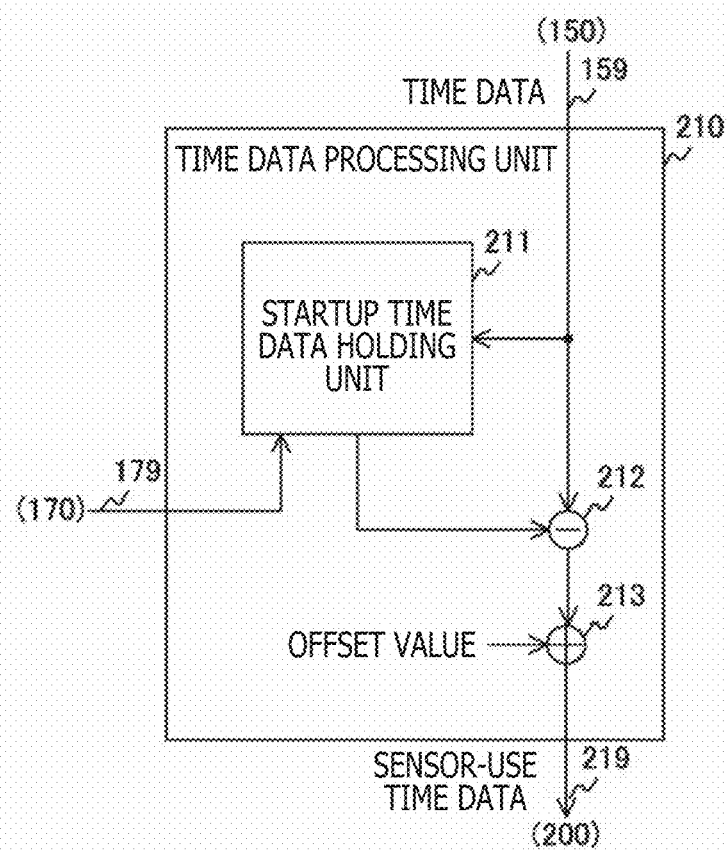
FIG. 14 is a block diagram illustrating a configuration example of the time data processing unit configured to add an offset value according to the third modified example of the first embodiment of the present technology.

Note that, as exemplified in FIG. 14, the time data processing unit 210 may further include an adder 213 configured to add a predetermined offset value to the difference. For example, in a case where minute, second, and millisecond values are only initialized at startup while day and hour values are used as they are, the day and hour values are added as the offset values.

In this way, in the third modified example of the first embodiment of the present technology, the time data of the timer 150 is not initialized at startup and the sensor-use time data is separately generated. Thus, the time data of the timer 150 can be used as the internal clock.

2. Second Embodiment

In the first embodiment described above, the wearable devices 101 to 104 are worn by the respective runners different from each other on a one-to-one basis, but all the devices can be worn by one runner. When one runner wears a plurality of devices configured to measure physical quantities different from each other, for example, a plurality of physical quantities can be simultaneously measured. The sensing system 100 of a second embodiment is different from the first embodiment in that a plurality of physical quantities of one runner are simultaneously measured.

Figure 15:
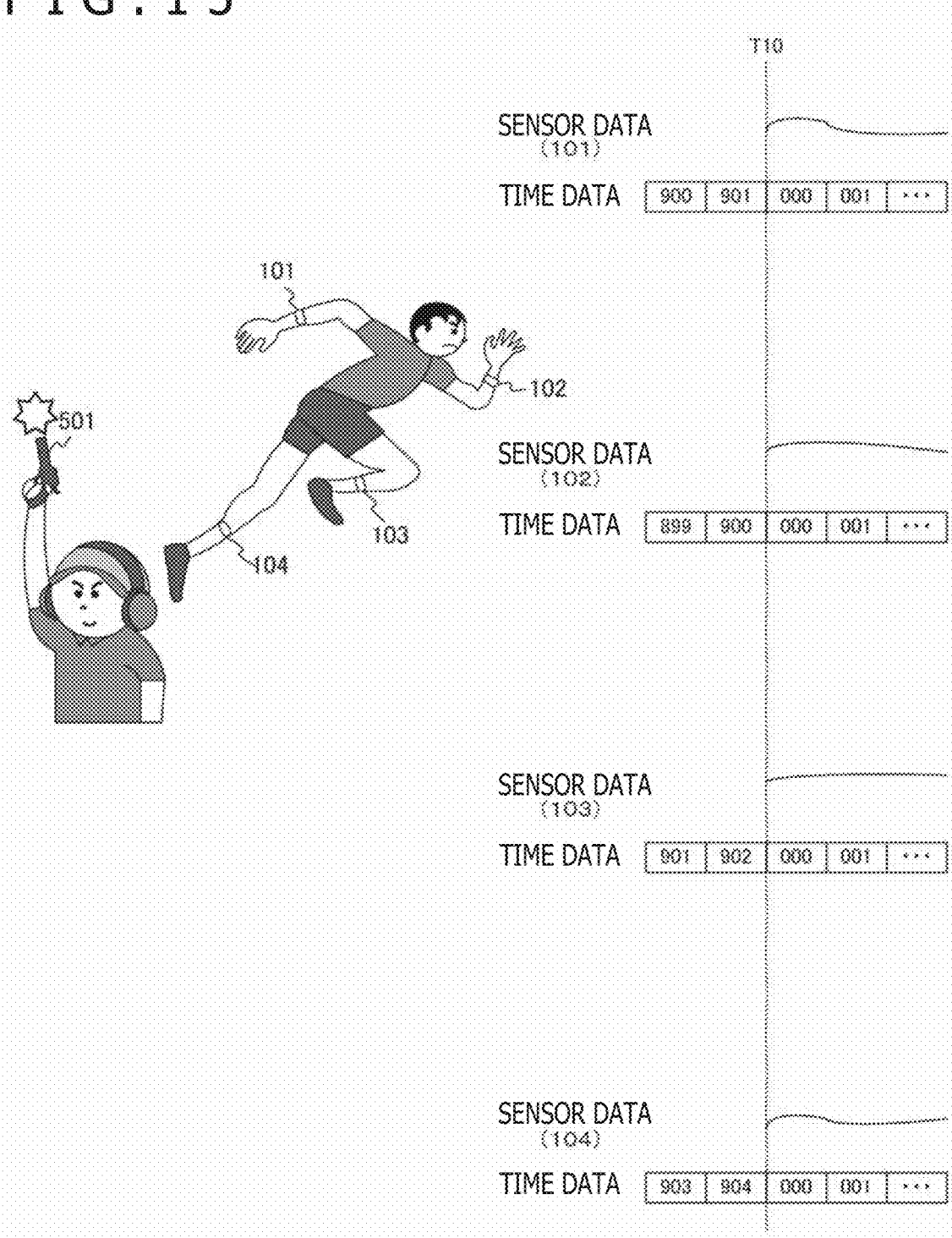
FIG. 15 is a diagram illustrating a configuration example of a sensing system according to a second embodiment of the present technology.

FIG. 15 is a diagram illustrating a configuration example of the sensing system 100 according to the second embodiment of the present technology. The wearable devices 101 to 104 of the sensing system 100 of the second embodiment are worn by one runner. Also, the respective wearable devices 101 to 104 measure physical quantities different from each other depending on the trigger signal. For example, the wearable device 101 measures acceleration, and the wearable device 102 measures angular velocity. Also, the wearable device 103 measures pulses, and the wearable device 104 measures temperature. As a result, the sensing system 100 can start simultaneous measurement of a plurality of physical quantities different from each other.

In this way, in the second embodiment of the present technology, the wearable device 101 and other devices measure a plurality of physical quantities different from each other depending on the trigger signal, and hence measurement timings of a plurality of physical quantities can be synchronized with each other.

3. Third Embodiment

In the first embodiment described above, in the sensing system 100, one kind of signal (for example, only a sound signal) is used as the trigger signal. In some tournaments, however, the start is indicated with the use of another kind of signal, and timings cannot be synchronized with each other in such tournaments. In this case, it is sufficient if a device that uses another type of signal (for example, optical signal) as the trigger signal is used instead, but switching a device depending on a situation is troublesome. When the wearable device 101 and other devices use a plurality of kinds of signals as the trigger signals, the wearable device 101 and other devices can support both of a case where a sound signal is used as a starting signal and a case where an optical signal is used as the starting signal, for example. The sensing system 100 of a third embodiment is different from the first embodiment in that a sound signal and an optical signal are used as the trigger signals.

Figure 16:
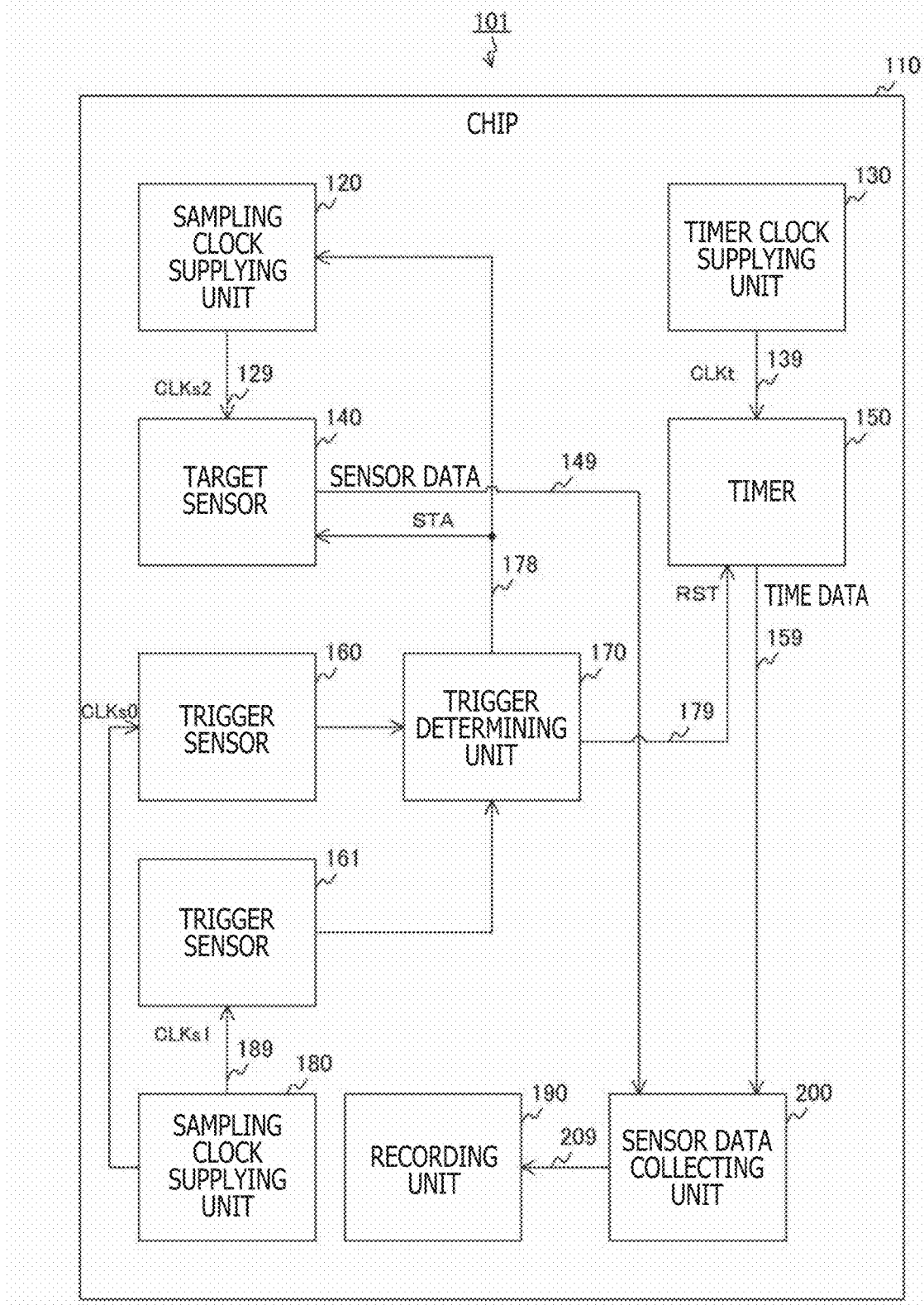
FIG. 16 is a diagram illustrating a configuration example of a wearable device according to a third embodiment of the present technology.

FIG. 16 is a diagram illustrating a configuration example of the wearable device 101 according to the third embodiment of the present technology. The wearable device 101 is different from the first embodiment in that the wearable device 101 further includes a trigger sensor 161. The trigger sensor 161 measures a value of a signal different from the one that the trigger sensor 160 measures. For example, the trigger sensor 160 measures a value of a sound signal, and the trigger sensor 161 measures a value of an optical signal. Also, a sampling clock CLKs0 is supplied to the trigger sensor 160, and the sampling clock CLKs1 is supplied to the trigger sensor 161.

The trigger determining unit 170 of the third embodiment determines whether the signal value of each of the sound signal and the optical signal satisfies a predetermined condition or not. For example, when the value of the sound signal is larger than a threshold Th1 or the value of the optical signal is larger than a threshold Th2, the trigger determining unit 170 determines that the condition is satisfied and generates the start signal STA. As a result, the sensing system 100 can support both of a case where only a sound signal is used as the starting signal and a case where only an optical signal is used as the starting signal, and the universality thereof can be improved.

Note that, the trigger determining unit 170 may determine that the condition is satisfied when the value of the sound signal is larger than the threshold Th1 and the value of the optical signal is larger than the threshold Th2. Some starter pistols are products configured to emit light together with sound, and in a case where such products are used, the timings can be positively synchronized with each other. As a result, the reliability of the sensing system 100 can be improved.

Also, the sensing system 100 uses the two signals of a sound signal and an optical signal as the trigger signals, but the sensing system 100 may use three or more signals as the trigger signals. Furthermore, the sensing system 100 may use a combination of a plurality of signals other than a sound signal and an optical signal as the trigger signals.

In this way, in the third embodiment of the present technology, the wearable device 101 and other devices measure values of optical signals in addition to sound signals, and hence the universality and reliability of the system can be improved compared to the case where a sound signal is only measured.

4. Fourth Embodiment

In the first embodiment described above, one wearable device worn by each runner measures one physical quantity (for example, acceleration). In a case where a plurality of physical quantities of each runner are measured, however, it is necessary to prepare a plurality of wearable devices for each runner, with the result that time required for the runner to wear the devices may be increased, leading to a reduction in convenience of the system. In this case, each wearable device desirably measures a plurality of physical quantities. The sensing system 100 of a fourth embodiment is different from the first embodiment in that one wearable device measures a plurality of physical quantities.

Figure 17:
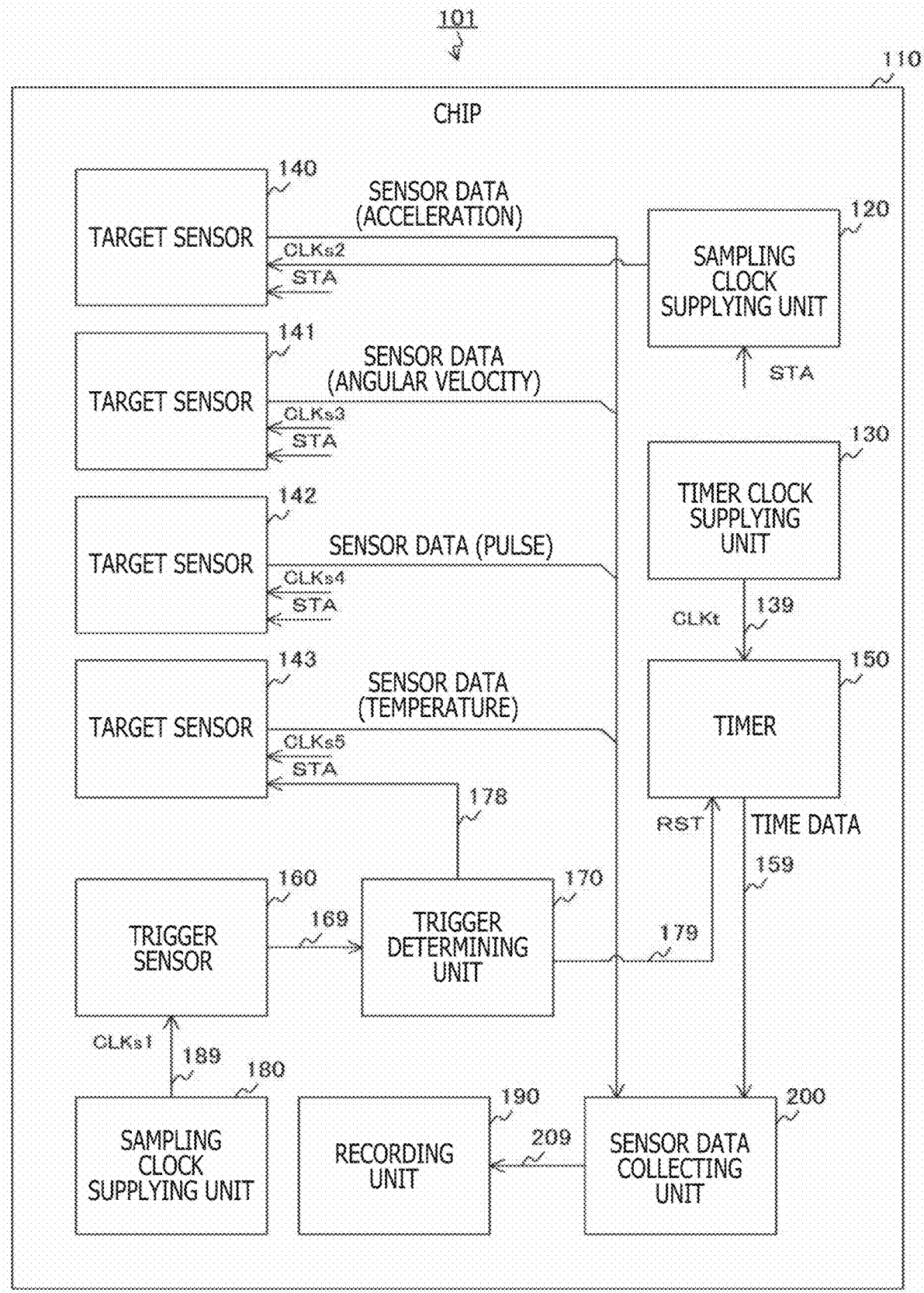
FIG. 17 is a diagram illustrating a configuration example of a wearable device according to a fourth embodiment of the present technology.

FIG. 17 is a diagram illustrating a configuration example of the wearable device 101 according to the fourth embodiment of the present technology. The wearable device 101 is different from the first embodiment in that the wearable device 101 further includes target sensors 141, 142, and 143. The target sensors 140, 141, 142, and 143 measure physical quantities different from each other. For example, the target sensor 140 measures acceleration, and the target sensor 141 measures angular velocity. Also, the target sensor 142 measures pulses, and the target sensor 143 measures temperature.

The trigger determining unit 170 also supplies the start signal to the target sensors 141, 142, and 143. Also, the sampling clock supplying unit 120 supplies sampling clocks CLKs3, CLKs4, and CLKs5 to the target sensors 141, 142, and 143. The sensor data collecting unit 200 also records sensor data from each of the target sensors 141, 142, and 143 in the recording unit 190 in association with the time data.

The configurations of the wearable devices 102, 103, and 104 are similar to that of the wearable device 101.

Note that, the number of wearable devices is not limited to four. When the number of runners is one, for example, only the wearable device 101 is provided.

In this way, in the fourth embodiment of the present technology, the wearable device 101 and other devices configured to measure a plurality of physical quantities are worn by each of a plurality of runners, and hence the sensing system 100 can measure a plurality of physical quantities of each runner.

5. Fifth Embodiment

In the first embodiment described above, only the time data is initialized depending on the trigger signal, but a deviation in time data may occur between the devices including the wearable device 101. This is because the timer clocks CLKt are not synchronized with each other between the devices, and deviations of the clocks in question are accumulated over time. Thus, it is desirable that time correction be regularly performed. The sensing system 100 of a fifth embodiment is different from the first embodiment in that the sensing system 100 performs time correction regularly.

Figure 18:
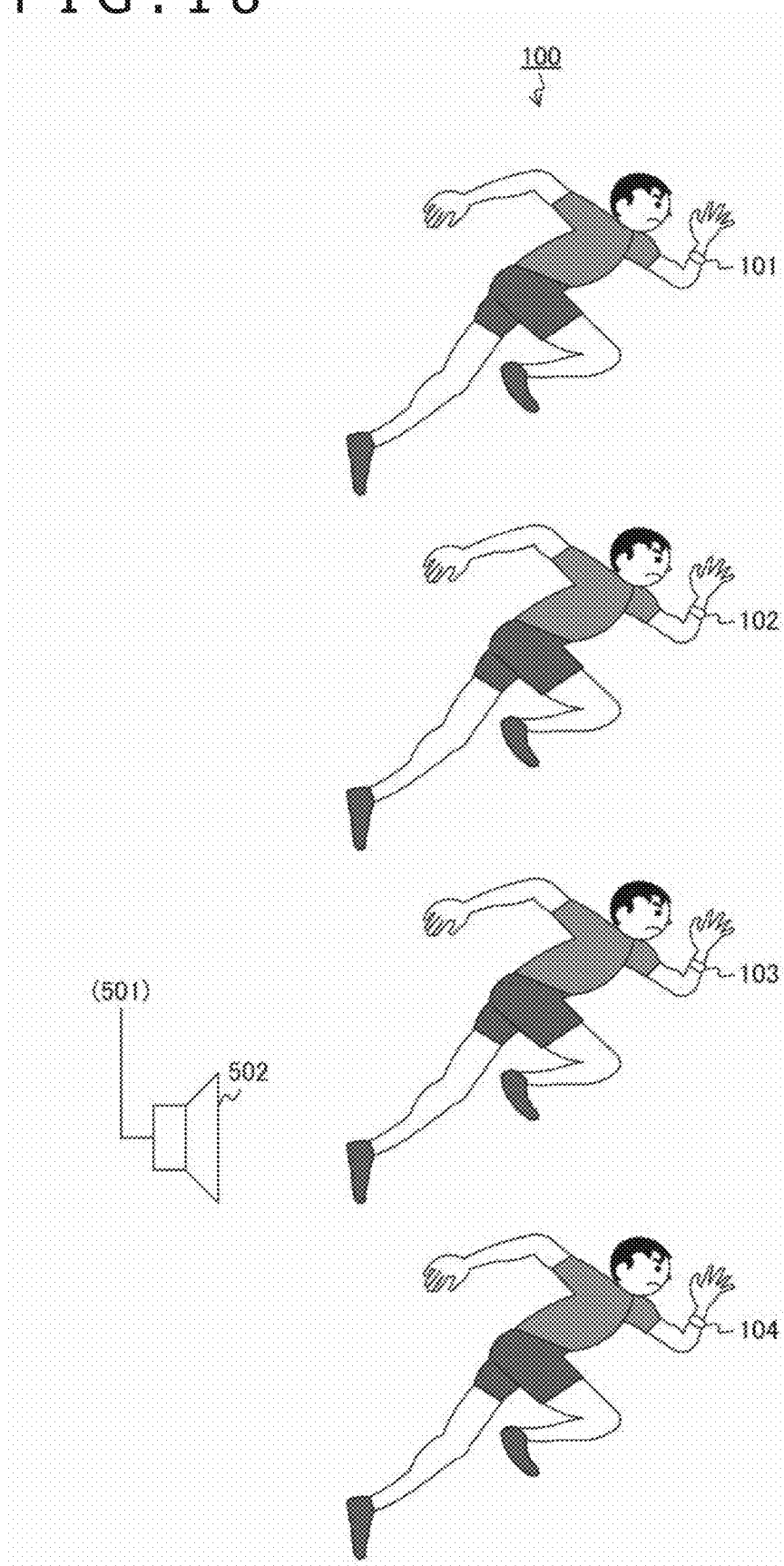
FIG. 18 is an overall view illustrating a configuration example of a sensing system according to a fifth embodiment of the present technology.

FIG. 18 is an overall view illustrating a configuration example of the sensing system 100 according to the fifth embodiment of the present technology. The sensing system 100 of the fifth embodiment further includes a speaker 502. The speaker 502 is connected to the starter pistol 501 with a cable or wirelessly.

The speaker 502 regularly outputs, after the starter pistol 501 emits a sound signal, the sound signal. Here, the sound signal that the speaker 502 outputs is desirably a sound signal in such a high frequency range that humans cannot hear (for example, 20 kilohertz or higher) so that the concentration of the runners is not lost.

The wearable device 101 and other devices each correct time depending on the sound signal in the high frequency range. For example, the speaker 502 outputs the sound signal every M (M is a real number) seconds. In addition, the trigger determining unit 170 in the wearable device 101 repeatedly measures, after time measurement is started, a signal value of the sound signal in the high frequency range in synchronization with the sampling clock CLKs1. In addition, every time the trigger determining unit 170 determines that the signal value in question is higher than a threshold, the trigger determining unit 170 counts the determinations and sends a control signal depending on the count value in question to the timer 150. When the number of determinations is N (N is an integer), for example, the trigger determining unit 170 sends a control signal for correcting the time data to M×N seconds.

Note that, with the trigger signal being an optical signal, a light-emitting device configured to regularly emit an optical signal may be placed instead of the speaker 502, and the wearable device 101 and other devices may correct time depending on the optical signal in question. In this case, the optical signal that the light-emitting device emits is desirably invisible light such as infrared light so that the concentration of the runners is not lost. Also, a sound signal may be used as the starting signal while an optical signal may be used for correction. In this case, it is sufficient if a plurality of trigger sensors are provided in the wearable device 101 as in the third embodiment.

Figure 19:
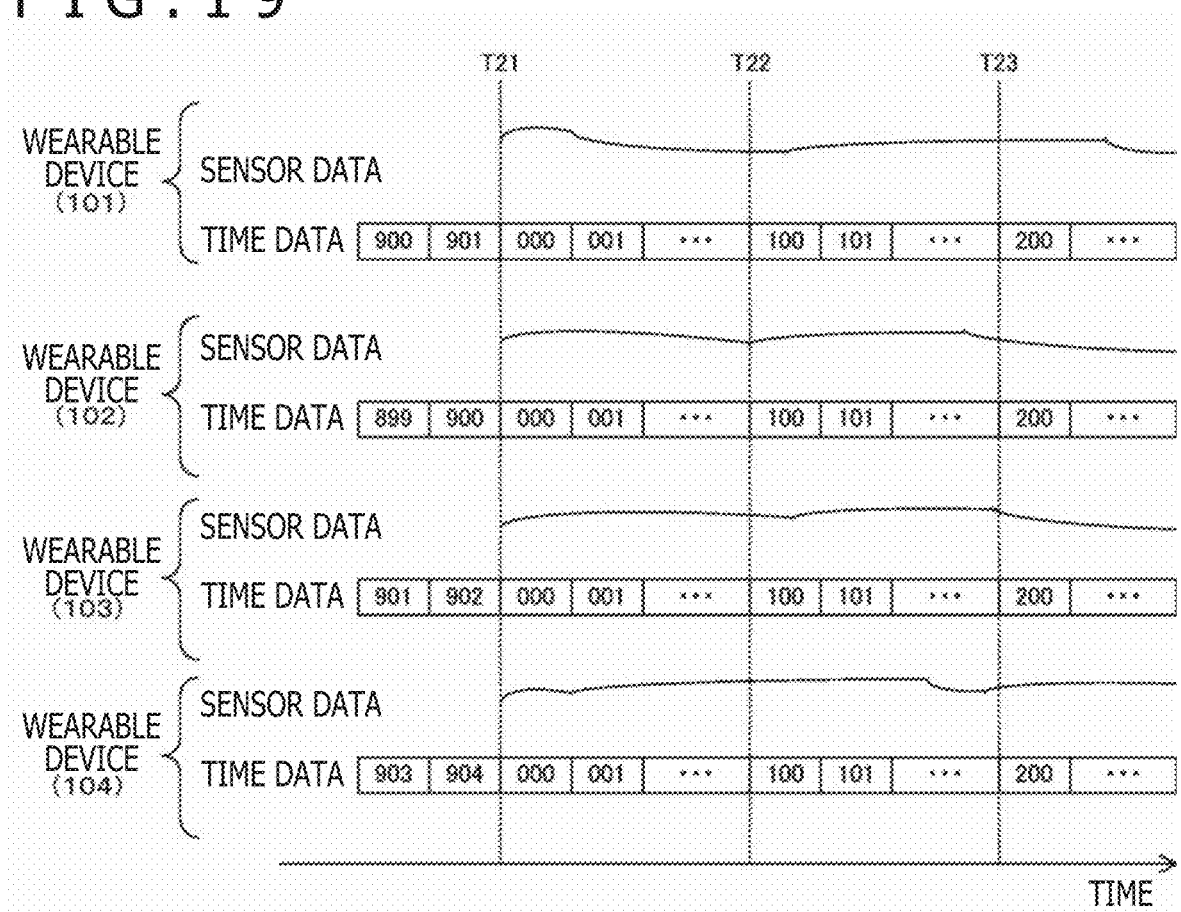
FIG. 19 is a timing chart illustrating operation of the sensing system when the sensing system corrects time according to the fifth embodiment of the present technology.

FIG. 19 is a timing chart illustrating operation of the sensing system 100 when the sensing system corrects time according to the fifth embodiment of the present technology. When the starter pistol 501 is fired at a timing T21, the wearable devices 101 to 104 each initialize the time data and start to measure the sensor data (for example, acceleration). In FIG. 19, for the sake of the description, the millisecond values of the time data are only illustrated.

In addition, after 0.1 seconds elapses from the timing T21, at a timing T22, the speaker 502 outputs a sound signal. The wearable devices 101 to 104 each correct the time data to 0.1 seconds (more specifically, 100 milliseconds) on the basis of the sound signal in question.

Furthermore, after 0.1 seconds elapses from the timing T22, at a timing T23, the speaker 502 outputs a second sound signal. The wearable devices 101 to 104 each correct the time data to 0.2 seconds (more specifically, 200 milliseconds) on the basis of the sound signal in question. Hereinafter, in a similar manner, the speaker 502 outputs an N-th sound signal every 0.1 seconds, and the wearable device 101 and other devices correct the time data to N×0.1 seconds every time the speaker 502 outputs the sound signal.

In this way, in the fifth embodiment of the present technology, the wearable device 101 corrects the time data on the basis of the sound signal after time measurement is started, and each device can therefore clock accurate time.

5. Application Example

A technology according to the present disclosure is applicable to a technology that is so-called IoT (Internet of Things). IoT is a mechanism in which an IoT device 9100 that is a "thing" is connected to another IoT device 9003, the Internet, a cloud 9005, and the like and exchanges information to control each other. IoT can be used in various industries such as agriculture, houses, automobiles, manufacture, distribution, and energy.

Figure 20:
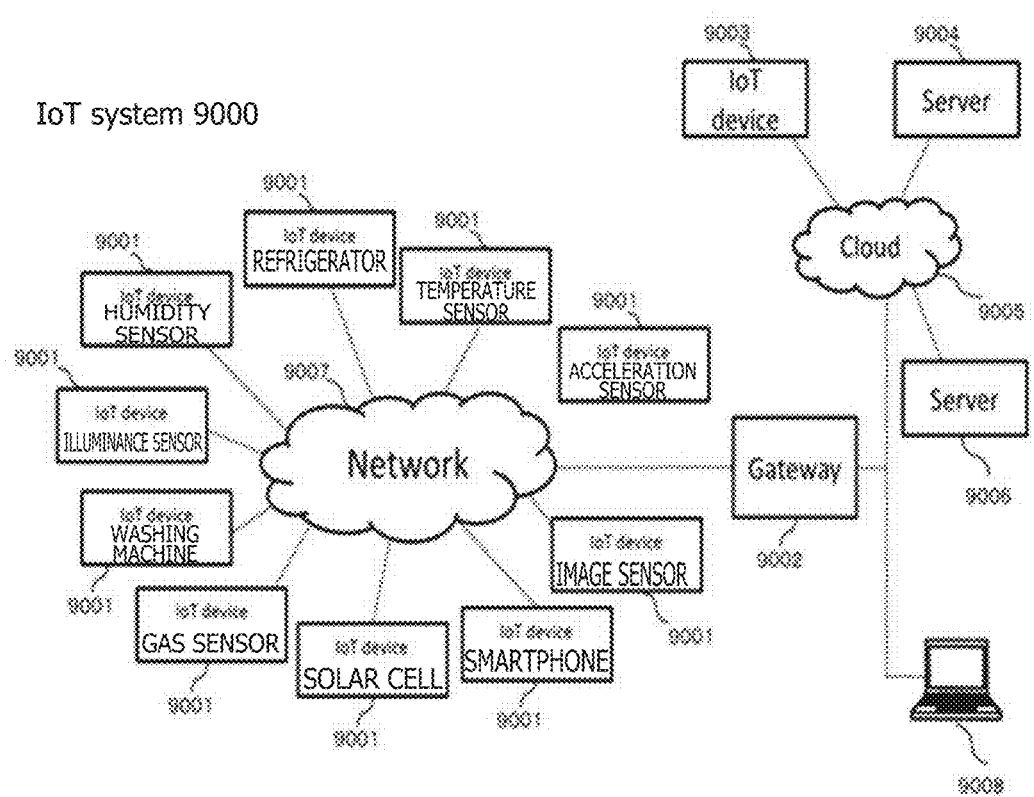
FIG. 20 is a diagram illustrating an example of a schematic configuration of an IoT system 9000 to which a technology according to the present disclosure is applicable.

FIG. 20 is a diagram illustrating an example of a schematic configuration of an IoT system 9000 to which the technology according to an embodiment of the present disclosure is applicable.

The IoT devices 9001 include a variety of sensors such as temperature, humidity, illuminance, acceleration, distance, image, gas, and human sensors. Further, the IoT devices 9001 may additionally include terminals such as a smartphone, a mobile phone, a wearable terminal, and a gaming device. The IoT devices 9001 are powered, for example, by an alternating current (AC) power supply, a direct current (DC) power supply, a battery, a non-contact power supply, energy harvesting or the like. The IoT devices 9001 are capable, for example, of wired, wireless, and short-range wireless communication. Communication schemes suitably used are third-generation (3G)/LTE, wireless fidelity (Wi-Fi), institute of electrical and electronic engineers (IEEE) 802.15.4, Bluetooth, Zigbee, and Z-Wave. The IoT devices 9001 may switch between the plurality of these communication sections to achieve communication.

The IoT devices 9001 may form one-to-one, star, tree, and mesh networks. The IoT devices 9001 may connect to the external cloud 9005 directly or via a gateway 9002. An address is assigned to each of the IoT devices 9001, for example, by internet protocol version (IPv) 4, IPv6, or IPv6 over low power wireless personal area networks (6LowPAN). Data collected from the IoT devices 9001 is sent to the other IoT device 9003, a server 9004, the cloud 9005, and so on. The timings and frequency for sending data from the IoT devices 9001 may be suitably adjusted for transmission of data in a compressed form. Such data may be used in an 'as-is' manner or analyzed by a computer 9008 by various sections such as statistical analysis, machine learning, data mining, cluster analysis, discriminant analysis, combinational analysis, and chronological analysis. Such use of data enables provision of numerous services including control, warning, monitoring, visualization, automation, and optimization.

The technology according to an embodiment of the present disclosure is also applicable to home-related devices and services. The IoT devices 9001 in homes include washing machine, drying machine, dryer, microwave oven, dish washing machine, refrigerator, oven, electric rice cooker, cooking appliances, gas appliances, fire alarm, thermostat, air-conditioner, television (TV) set, recorder, audio appliances, lighting appliances, electric water heater, hot water dispenser, vacuum cleaner, electric fan, air purifier, security camera, lock, door-shutter opener/closer, sprinkler, toilet, thermometer, weighing scale, sphygmomanometer and the like. Further, the IoT devices 9001 may include solar cell, fuel cell, storage battery, gas meter, electric power meter, and distribution panel.

A low power consumption communication scheme is desirable as a communication scheme for the IoT devices 9001 in homes. Further, the IoT devices 9001 may communicate by Wi-Fi indoors and by 3G/LTE outdoors. An external server 9006 designed to control IoT devices may be provided on the cloud 9005 to control the IoT devices 9001. The IoT devices 9001 send data including statuses of home appliances, temperature, humidity, power consumption, and presence or absence of humans and animals indoors and outdoors. Data sent from the home appliances is accumulated in the external server 9006 via the cloud 9005. New services are made available based on such data. The IoT devices 9001 designed as described above can be controlled by voice using voice recognition technologies.

In addition, direct transmission of information from the home appliances to the TV set permits visualization of the statuses of the home appliances. Further, determination of whether or not the resident is at home and transmission of data to air-conditioners and lighting appliances by various sensors makes it possible to turn the power thereof on and off. Still further, advertisements can be shown on the displays provided to various home appliances via the Internet.

In the above description, an example of the IoT system 9000 to which the technology according to the present disclosure is applicable is described. The technology according to the present disclosure is suitably applicable to the IoT device 9001 among the configurations described above. Specifically, the IoT devices 9001 each start to measure the measurement target depending on the trigger signal. With the IoT system 9000 to which the technology according to the present disclosure is applied, the measurement timings can be synchronized with each other with the simple configuration.

Note that, the embodiments described above represent an example for embodying the present technology, and items in the embodiments have respective corresponding relations to specific inventive items in claims. In a similar manner, specific inventive items in claims have respective corresponding relations to items given the same names as the items in the embodiments of the present technology. However, the present technology is not limited to the embodiments, and can be embodied by making various modifications to the embodiments without departing from the gist of the present technology.

Also, the process procedures described in the foregoing embodiments may be regarded as a method having the series of procedures. Furthermore, the process procedures may be regarded as a program for making a computer perform the series of procedures or a recording medium storing the program. Usable as the recording medium is, for example, a CD (Compact Disc), an MD (MiniDisc), a DVD (Digital Versatile Disc), a memory card, or a Blu-ray Disc (registered trademark).

Note that, the effects described in the present specification are only exemplary and are not limited. Also, another effect may be provided.

Note that, the present technology can employ the following configurations.

(1) A sensing system, including:
a plurality of sensor devices each including:
a trigger sensor configured to measure a signal value of a trigger signal; and
a target sensor configured to start to measure a physical quantity of a measurement target when the measured signal value satisfies a predetermined condition.
(2) The sensing system according to the item (1), in which the plurality of sensor devices each further include a timer configured to start time measurement when the signal value measured by the trigger sensor satisfies the predetermined condition.
(3) The sensing system according to the item (2), in which the timer corrects time based on the signal value after time measurement is started.
(4) The sensing system according to the item (2) or (3), in which the timer is initialized to a predetermined initial value when the signal value satisfies the predetermined condition.
(5) The sensing system according to the item (1), in which the plurality of sensor devices each further include:
a timer configured to clock time data; and
a time data processing unit configured to hold, as startup time data, the time data when the signal value satisfies the predetermined condition, and generate sensor-use time data from a difference between the startup time data and the time data.
(6) The sensing system according to any one of the items (1) to (4), in which the plurality of sensor devices each include, as the target sensor, a plurality of sensors configured to measure physical quantities different from each other.
(7) The sensing system according to any one of the items (1) to (6), in which the plurality of sensor devices each include, as the trigger sensor, a plurality of sensors configured to measure signals different from each other.
(8) The sensing system according to any one of the items (1) to (7),
in which the target sensor measures the physical quantity in synchronization with a sampling clock having a predetermined frequency, and
in which the trigger sensor measures the signal value in synchronization with a sampling clock having a frequency higher than the predetermined frequency.
(9) The sensing system according to any one of the items (1) to (8), in which the trigger signal includes at least one of a sound signal and an optical signal.
(10) The sensing system according to any one of the items (1) to (8), in which the target sensor is an image sensor.
(11) The sensing system according to any one of the items (1) to (9), in which the trigger sensor is an image sensor.
(12) A sensor device, including:
a trigger sensor configured to measure a signal value of a trigger signal; and
a target sensor configured to start to measure a physical quantity of a measurement target when the measured signal value satisfies a predetermined condition.

REFERENCE SIGNS LIST

100 Sensing system
101, 102, 103, 104 Wearable device
110 Chip
120, 180 Sampling clock supplying unit
130 Timer clock supplying unit
140, 141, 142, 143 Target sensor
150 Timer
160, 161 Trigger sensor
170 Trigger determining unit
190 Recording unit
200 Sensor data collecting unit
210 Time data processing unit
211 Startup time data holding unit
212 Subtractor
213 Adder
300, 301 Monitoring camera
501 Starter pistol
502 Speaker
9001 IoT device

The invention claimed is:
1. A sensing system, comprising:
a plurality of sensor devices each including:
a trigger sensor configured to measure a signal value of a trigger signal; and
a target sensor configured to start to measure a physical quantity of a measurement target based on a predetermined condition being satisfied by the measured signal value,
wherein the target sensor measures the physical quantity in synchronization with a sampling clock that has a predetermined frequency, and the trigger sensor measures the signal value in synchronization with a sampling clock that has a frequency higher than the predetermined frequency.
2. The sensing system according to claim 1, wherein each sensor device of the plurality of sensor devices further includes a timer configured to start time measurement based on the predetermined condition being satisfied by the signal value measured by the trigger sensor.
3. The sensing system according to claim 2, wherein the timer corrects time based on the signal value after time measurement is started.
4. The sensing system according to claim 2, wherein the timer is initialized to a predetermined initial value based on the predetermined condition being satisfied by the measured signal value.
5. The sensing system according to claim 1, wherein each sensor device of the plurality of sensor devices further includes:
a timer configured to clock time data; and
a time data processing unit configured to hold, as startup time data, the time data based on the predetermined condition being satisfied by the measured signal value, and generate sensor-use time data from a difference between the startup time data and the time data.
6. The sensing system according to claim 1, wherein each sensor device of the plurality of sensor devices includes, as the target sensor, a plurality of sensors configured to measure physical quantities different from each other.

7. The sensing system according to claim 1, wherein each sensor device of the plurality of sensor devices includes, as the trigger sensor, a plurality of sensors configured to measure signals different from each other.

8. The sensing system according to claim 1, wherein the trigger signal includes at least one of a sound signal and an optical signal.

9. The sensing system according to claim 1, wherein the target sensor comprises an image sensor.

10. The sensing system according to claim 1, wherein the trigger sensor comprises an image sensor.

11. A sensor device, comprising:
a trigger sensor configured to measure a signal value of a trigger signal;
a target sensor configured to start to measure a physical quantity of a measurement target based on a predetermined condition being satisfied by the measured signal value;
a timer configured to clock time data; and
a time data processing unit configured to hold, as startup time data, the time data based on the predetermined condition being satisfied by the signal value, and generate sensor-use time data from a difference between the startup time data and the time data.

12. A sensing system, comprising:
a plurality of sensor devices each including:
a trigger sensor configured to measure a signal value of a trigger signal;
a target sensor configured to start to measure a physical quantity of a measurement target based on a predetermined condition being satisfied by the measured signal value; and
a timer configured to:
start time measurement based on the predetermined condition being satisfied by the signal value measured by the trigger sensor; and
correct time based on the signal value after the time measurement is started.

* * * * *